US012021437B2

(12) United States Patent
Duncan et al.

(10) Patent No.: US 12,021,437 B2
(45) Date of Patent: Jun. 25, 2024

(54) ROTARY POWER TOOL

(71) Applicant: MILWAUKEE ELECTRIC TOOL CORPORATION, Brookfield, WI (US)

(72) Inventors: Ian A. Duncan, Milwaukee, WI (US); Christopher D. Jornlin, Milwaukee, WI (US); Caleb M. Schober, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 820 days.

(21) Appl. No.: 17/051,921

(22) PCT Filed: Jun. 12, 2020

(86) PCT No.: PCT/US2020/037546
§ 371 (c)(1),
(2) Date: Oct. 30, 2020

(87) PCT Pub. No.: WO2020/252350
PCT Pub. Date: Dec. 17, 2020

(65) Prior Publication Data
US 2023/0246516 A1    Aug. 3, 2023

Related U.S. Application Data

(60) Provisional application No. 62/909,281, filed on Oct. 2, 2019, provisional application No. 62/860,347, filed on Jun. 12, 2019.

(51) Int. Cl.
*H02K 5/24*    (2006.01)
*B24B 41/00*    (2006.01)
(Continued)

(52) U.S. Cl.
CPC ............. *H02K 5/24* (2013.01); *B24B 41/007* (2013.01); *B24B 47/12* (2013.01); *B25F 5/006* (2013.01);
(Continued)

(58) Field of Classification Search
CPC ... B25F 5/006; B25F 5/02; B25G 1/01; B25D 17/043; B24B 41/007
(Continued)

(56) References Cited

U.S. PATENT DOCUMENTS 2,170,036 A    8/1939 Schumann
2,452,268 A    10/1948 Schumann
(Continued)

FOREIGN PATENT DOCUMENTS

CN    201111456 Y    9/2008
CN    201260114 Y    6/2009
(Continued)

OTHER PUBLICATIONS

Extended European Search Report for Application No. 20823690.1 dated Mar. 1, 2023 (8 pages).
(Continued)

Primary Examiner — Joshua G Kotis
(74) Attorney, Agent, or Firm — Michael Best & Friedrich LLP

(57) ABSTRACT

A power tool includes a motor housing, a motor, a handle coupled to the housing, and a vibration damping assembly. The motor is positioned in the motor housing and configured to rotatably drive an output shaft. The vibration damping assembly is positioned between the motor housing and the handle. The vibration damping assembly includes a first coupling portion defined by the motor housing, a second coupling portion defined by the handle, and an elastomeric damper captured between the first coupling portion and the
(Continued)

second coupling portion. The first coupling portion includes a boss having a flange and a first groove. The second coupling portion defines an opening and includes first and second ribs extending into the opening and spaced apart along a longitudinal axis of the handle. The first and second ribs define a second groove therebetween. The damper occupies the first and second grooves.

14 Claims, 16 Drawing Sheets

(51) Int. Cl.
| | |
|---|---|
| *B24B 47/12* | (2006.01) |
| *B25F 5/00* | (2006.01) |
| *B25F 5/02* | (2006.01) |
| *H02K 7/04* | (2006.01) |
| *H02K 7/08* | (2006.01) |
| *H02K 7/14* | (2006.01) |
| *H02K 9/06* | (2006.01) |
| *B24B 23/02* | (2006.01) |

(52) U.S. Cl.
CPC ............. *B25F 5/02* (2013.01); *H02K 7/04* (2013.01); *H02K 7/083* (2013.01); *H02K 7/145* (2013.01); *H02K 9/06* (2013.01); *B24B 23/02* (2013.01)

(58) Field of Classification Search
USPC .......................................... 173/162.1, 162.2
See application file for complete search history.

(56) References Cited

U.S. PATENT DOCUMENTS

| | | | |
|---|---|---|---|
| 2,532,823 A | 12/1950 | Schumann | |
| 2,696,569 A | 12/1954 | Schumann | |
| 2,779,883 A | 1/1957 | Schumann | |
| 3,482,362 A | 12/1969 | Bangerter et al. | |
| 4,158,225 A | 6/1979 | Hertz | |
| 4,643,263 A | 2/1987 | Karden | |
| 4,771,833 A | 9/1988 | Honsa | |
| 4,936,394 A | 6/1990 | Ohtsu | |
| 5,144,175 A | 9/1992 | Craggs | |
| 5,335,455 A | 8/1994 | Bergner | |
| 5,681,667 A | 10/1997 | Bunyea et al. | |
| 5,692,574 A * | 12/1997 | Terada | B25D 17/043 |
| | | | 173/162.2 |
| 5,741,305 A | 4/1998 | Vincent et al. | |
| 5,775,981 A | 7/1998 | Yang | |
| 5,831,358 A | 11/1998 | Bobay | |
| 6,026,910 A * | 2/2000 | Masterson | B25F 5/006 |
| | | | 267/141.1 |
| 6,147,423 A | 11/2000 | Byrd | |
| 6,181,032 B1 * | 1/2001 | Marshall | B25F 3/00 |
| | | | 200/321 |
| 6,375,171 B1 | 4/2002 | Zimmermann et al. | |
| 6,412,180 B1 | 7/2002 | Wolf et al. | |
| 6,446,421 B1 | 9/2002 | Kramer et al. | |
| 6,713,905 B2 | 3/2004 | Hirschburger et al. | |
| 6,766,868 B2 | 7/2004 | Frauhammer et al. | |
| 6,796,386 B2 * | 9/2004 | Izumisawa | B25F 5/00 |
| | | | 173/93.5 |
| 6,799,642 B2 | 10/2004 | Wolf et al. | |
| 6,948,570 B2 | 9/2005 | Kristen et al. | |
| 7,052,382 B2 | 5/2006 | Baker | |
| 7,076,838 B2 | 7/2006 | Meixner | |
| 7,100,706 B2 | 9/2006 | Meixner et al. | |
| 7,121,859 B2 | 10/2006 | Van Schuylenbergh et al. | |
| 7,137,542 B2 | 11/2006 | Oki et al. | |
| 7,148,428 B2 | 12/2006 | Meier et al. | |
| 7,152,853 B2 | 12/2006 | Menzel et al. | |
| 7,204,744 B2 | 4/2007 | Lamprecht et al. | |
| 7,217,178 B2 | 5/2007 | Oki et al. | |
| 7,252,156 B2 | 8/2007 | Sugiyama et al. | |
| 7,287,601 B2 | 10/2007 | Hellbach et al. | |
| 7,306,049 B2 | 12/2007 | Soika et al. | |
| 7,322,428 B2 | 1/2008 | Bacila | |
| 7,331,408 B2 | 2/2008 | Arich et al. | |
| 7,472,760 B2 | 1/2009 | Stirm et al. | |
| 7,500,527 B2 | 3/2009 | Fischer et al. | |
| 7,513,317 B2 | 4/2009 | Satou | |
| 7,517,276 B2 | 4/2009 | Kuragano et al. | |
| 7,523,790 B2 | 4/2009 | Arakawa et al. | |
| 7,526,868 B2 | 5/2009 | Oki et al. | |
| 7,527,107 B2 | 5/2009 | Berger et al. | |
| 7,591,325 B2 | 9/2009 | Robieu | |
| 7,610,967 B2 | 11/2009 | Fischer et al. | |
| 7,614,460 B2 | 11/2009 | Henriksson et al. | |
| 7,640,997 B2 | 1/2010 | Bram et al. | |
| 7,673,703 B2 | 3/2010 | Fischer et al. | |
| 7,676,890 B2 | 3/2010 | Zhang et al. | |
| 7,698,779 B2 | 4/2010 | Schliemann et al. | |
| 7,705,497 B2 | 4/2010 | Arich et al. | |
| 7,708,260 B2 | 5/2010 | Eicher et al. | |
| 7,721,390 B2 | 5/2010 | Pfeiffer et al. | |
| 7,721,818 B2 | 5/2010 | Inagawa et al. | |
| 7,740,087 B2 | 6/2010 | Krondorfer et al. | |
| 7,743,514 B2 | 6/2010 | Oki et al. | |
| 7,762,348 B2 | 7/2010 | Stirm et al. | |
| 7,766,097 B2 | 8/2010 | Kondo | |
| 7,789,168 B2 | 9/2010 | Becht et al. | |
| 7,794,308 B2 | 9/2010 | Wuensch et al. | |
| 7,836,971 B2 | 11/2010 | Kikuchi et al. | |
| 7,837,434 B2 | 11/2010 | Rabis et al. | |
| 7,886,838 B2 | 2/2011 | Hahn | |
| 7,886,839 B2 | 2/2011 | Frauhammer et al. | |
| 7,921,934 B2 | 4/2011 | Aoki | |
| 7,921,935 B2 | 4/2011 | Engelfried et al. | |
| 7,941,930 B2 | 5/2011 | Guip | |
| 7,942,212 B2 | 5/2011 | Zimmermann | |
| 7,958,946 B2 | 6/2011 | Kurzenberger et al. | |
| 7,971,655 B2 | 7/2011 | Steinke et al. | |
| 7,971,656 B2 | 7/2011 | Engelfried et al. | |
| 7,987,921 B2 | 8/2011 | Hahn | |
| 8,006,778 B2 | 8/2011 | Wiker et al. | |
| 8,038,513 B2 | 10/2011 | Roehm | |
| 8,061,438 B2 | 11/2011 | Schmid et al. | |
| 8,069,930 B2 | 12/2011 | Engelfried | |
| 8,082,634 B2 | 12/2011 | Frank et al. | |
| 8,100,745 B2 | 1/2012 | Zhang et al. | |
| 8,122,972 B2 | 2/2012 | Soika et al. | |
| 8,127,862 B2 | 3/2012 | Aoki | |
| 8,136,559 B2 | 3/2012 | Rosenau et al. | |
| 8,141,209 B2 | 3/2012 | Zhang et al. | |
| 8,162,075 B2 | 4/2012 | Roberts et al. | |
| 8,191,648 B2 | 6/2012 | Watanabe et al. | |
| 8,196,674 B2 | 6/2012 | Ikuta et al. | |
| 8,205,683 B2 | 6/2012 | Schadow et al. | |
| 8,235,138 B2 | 8/2012 | Aoki | |
| 8,240,395 B2 | 8/2012 | Kamegai et al. | |
| 8,256,528 B2 | 9/2012 | Oesterle et al. | |
| 8,261,854 B2 | 9/2012 | Kikuchi et al. | |
| 8,286,724 B2 | 10/2012 | Furusawa et al. | |
| 8,286,725 B2 | 10/2012 | Arich | |
| 8,327,949 B2 | 12/2012 | Meixner | |
| 8,403,076 B2 | 3/2013 | Iwakami | |
| 8,415,843 B2 | 4/2013 | Li et al. | |
| 8,430,181 B2 | 4/2013 | Stirm | |
| 8,430,182 B2 | 4/2013 | Soika et al. | |
| 8,443,912 B2 | 5/2013 | Fischer et al. | |
| 8,453,757 B2 | 6/2013 | Lamprecht et al. | |
| 8,475,236 B2 | 7/2013 | Zhang et al. | |
| 8,496,073 B2 | 7/2013 | Eisenhardt et al. | |
| 8,511,658 B2 | 8/2013 | Moessnang | |
| 8,522,894 B2 | 9/2013 | Kraenzler et al. | |
| 8,539,681 B2 | 9/2013 | Stein et al. | |
| 8,561,716 B2 | 10/2013 | Aoki | |
| 8,567,520 B2 | 10/2013 | Wolf et al. | |
| 8,584,769 B2 | 11/2013 | Friedrich et al. | |
| 8,621,719 B2 | 1/2014 | Nakashima et al. | |
| 8,672,305 B2 | 3/2014 | Wolf et al. | |

(56) References Cited

U.S. PATENT DOCUMENTS

| | | | |
|---|---|---|---|
| 8,695,724 B2 | 4/2014 | Nakashima | |
| 8,708,059 B2 | 4/2014 | Hahn et al. | |
| 8,714,280 B2 | 5/2014 | Moreno et al. | |
| 8,756,754 B2 | 6/2014 | Allen et al. | |
| 8,756,766 B2 | 6/2014 | Zhang et al. | |
| 8,783,377 B2 | 7/2014 | Baumann et al. | |
| 8,810,085 B2 | 8/2014 | Matsunaga et al. | |
| 8,844,647 B2 | 9/2014 | Kamegai et al. | |
| 8,914,947 B2 | 12/2014 | Weiss | |
| 8,939,231 B2 | 1/2015 | Roberts et al. | |
| 8,966,773 B2 | 3/2015 | Gregorich | |
| 8,985,236 B2 | 3/2015 | Wierer et al. | |
| 9,016,672 B2 | 4/2015 | Englund et al. | |
| 9,061,412 B2 | 6/2015 | Hahn | |
| 9,073,197 B2 | 7/2015 | Yamauchi | |
| 9,168,652 B2 | 10/2015 | Schadow et al. | |
| 9,174,290 B2 | 11/2015 | Schonfeld et al. | |
| 9,180,586 B2 | 11/2015 | Nemetz et al. | |
| 9,216,517 B2 | 12/2015 | Kurzenberger et al. | |
| 9,308,636 B2 | 4/2016 | Wyler | |
| 9,370,860 B2 | 6/2016 | Rieger et al. | |
| 9,434,062 B2 | 9/2016 | Kamegai | |
| 9,461,281 B2 | 10/2016 | Wackwitz et al. | |
| 9,505,118 B2 | 11/2016 | Furusawa et al. | |
| 9,623,547 B2 | 4/2017 | Kurzenberger et al. | |
| 9,724,814 B2 | 8/2017 | Yoshikane et al. | |
| 9,782,885 B2 | 10/2017 | Yoshikane et al. | |
| 9,815,185 B2 | 11/2017 | Machida | |
| 9,849,577 B2 | 12/2017 | Wyler et al. | |
| 9,884,416 B2 | 2/2018 | Chellew et al. | |
| 9,950,415 B2 | 4/2018 | Takeuchi et al. | |
| 9,950,416 B2 | 4/2018 | Kutsuna et al. | |
| 9,950,418 B2 | 4/2018 | Kakiuchi et al. | |
| 9,962,823 B2 | 5/2018 | Machida | |
| 9,993,915 B2 * | 6/2018 | Roberts | B25D 17/043 |
| 9,999,967 B2 | 6/2018 | Furusawa et al. | |
| 10,022,852 B2 | 7/2018 | Ikuta et al. | |
| 10,040,178 B2 | 8/2018 | Kondo et al. | |
| 10,040,184 B2 | 8/2018 | Roberts et al. | |
| 10,179,400 B2 | 1/2019 | Furusawa et al. | |
| 10,236,743 B2 | 3/2019 | Chen et al. | |
| 10,483,506 B2 * | 11/2019 | Klee | H01M 50/24 |
| 10,730,175 B2 | 8/2020 | Wolperding et al. | |
| 2003/0006051 A1 | 1/2003 | Schmitzer et al. | |
| 2003/0042803 A1 | 3/2003 | Hirschburger et al. | |
| 2003/0160082 A1 | 8/2003 | Gunther et al. | |
| 2003/0199239 A1 | 10/2003 | Hung | |
| 2004/0016082 A1 | 1/2004 | Yi | |
| 2004/0231867 A1 | 11/2004 | Becht et al. | |
| 2006/0156858 A1 | 7/2006 | Soika et al. | |
| 2006/0156859 A1 | 7/2006 | Nemetz | |
| 2006/0185867 A1 | 8/2006 | Frauhammer et al. | |
| 2006/0185868 A1 | 8/2006 | Becht | |
| 2006/0258274 A1 | 11/2006 | Oki et al. | |
| 2006/0261700 A1 | 11/2006 | Du et al. | |
| 2006/0277721 A1 * | 12/2006 | Barretta | B25F 5/02 16/421 |
| 2006/0289183 A1 | 12/2006 | Schreiber | |
| 2007/0034397 A1 | 2/2007 | Fischer et al. | |
| 2007/0084069 A1 | 4/2007 | Guip | |
| 2007/0143966 A1 | 6/2007 | Fischer | |
| 2007/0188984 A1 | 8/2007 | Opsitos, Jr. | |
| 2007/0289761 A1 | 12/2007 | Kumpf et al. | |
| 2007/0289763 A1 | 12/2007 | Wiker et al. | |
| 2007/0295521 A1 * | 12/2007 | Wiker | B24B 23/028 173/162.1 |
| 2007/0295522 A1 | 12/2007 | Bohne et al. | |
| 2008/0000664 A1 | 1/2008 | Steinke | |
| 2008/0017396 A1 | 1/2008 | Kristen et al. | |
| 2008/0073095 A1 | 3/2008 | Henriksson et al. | |
| 2008/0099222 A1 | 5/2008 | Ranger et al. | |
| 2008/0223594 A1 | 9/2008 | Eisenhardt et al. | |
| 2009/0038120 A1 | 2/2009 | Eicher et al. | |
| 2009/0038121 A1 | 2/2009 | Eicher et al. | |
| 2009/0038818 A1 | 2/2009 | Eicher et al. | |
| 2009/0039576 A1 | 2/2009 | Eicher et al. | |
| 2009/0075572 A1 | 3/2009 | Izumisawa | |
| 2009/0266571 A1 | 10/2009 | Baumann et al. | |
| 2009/0283282 A1 | 11/2009 | Zimmermann | |
| 2009/0321101 A1 | 12/2009 | Furusawa et al. | |
| 2010/0012339 A1 | 1/2010 | Hahn et al. | |
| 2010/0186979 A1 | 7/2010 | Krauter et al. | |
| 2010/0206595 A1 | 8/2010 | Kamegai | |
| 2010/0223760 A1 | 9/2010 | Henke et al. | |
| 2010/0224068 A1 | 9/2010 | Yu et al. | |
| 2011/0011608 A1 | 1/2011 | Saur | |
| 2011/0033320 A1 | 2/2011 | Heier et al. | |
| 2012/0012353 A1 | 1/2012 | Foerster et al. | |
| 2012/0073144 A1 | 3/2012 | Tamura et al. | |
| 2012/0118599 A1 | 5/2012 | Schadow et al. | |
| 2012/0125648 A1 | 5/2012 | Schadow et al. | |
| 2012/0184191 A1 | 7/2012 | Schulze | |
| 2012/0194023 A1 | 8/2012 | Lau et al. | |
| 2012/0233816 A1 | 9/2012 | Zhang et al. | |
| 2012/0312572 A1 | 12/2012 | Nemetz et al. | |
| 2013/0098648 A1 | 4/2013 | Furusawa et al. | |
| 2013/0207491 A1 | 8/2013 | Hatfield et al. | |
| 2014/0124231 A1 | 5/2014 | Hessenberger et al. | |
| 2014/0125158 A1 | 5/2014 | Hessenberger et al. | |
| 2014/0154114 A1 | 6/2014 | Seok et al. | |
| 2014/0190717 A1 * | 7/2014 | Simpson | G09F 23/00 29/428 |
| 2014/0262402 A1 | 9/2014 | Haman et al. | |
| 2015/0328760 A1 | 11/2015 | Ikuta et al. | |
| 2015/0328763 A1 | 11/2015 | Ito et al. | |
| 2015/0349695 A1 | 12/2015 | Hosokawa et al. | |
| 2015/0367495 A1 | 12/2015 | Takeda | |
| 2016/0001433 A1 | 1/2016 | Furusawa et al. | |
| 2016/0129579 A1 | 5/2016 | Friedrich et al. | |
| 2016/0167212 A1 | 6/2016 | Wyler et al. | |
| 2016/0176037 A1 | 6/2016 | Hirai | |
| 2016/0207188 A1 | 7/2016 | Weber et al. | |
| 2017/0008160 A1 | 1/2017 | Simma | |
| 2017/0037855 A1 | 2/2017 | Yin et al. | |
| 2017/0106518 A1 | 4/2017 | Takeuchi et al. | |
| 2017/0144287 A1 | 5/2017 | Fischer et al. | |
| 2017/0190041 A1 | 7/2017 | Dey, IV et al. | |
| 2017/0282264 A1 | 10/2017 | Alagesan et al. | |
| 2017/0334056 A1 | 11/2017 | Kawakami et al. | |
| 2017/0346364 A1 | 11/2017 | Hessenberger et al. | |
| 2017/0361447 A1 | 12/2017 | Ontl et al. | |
| 2018/0065240 A1 | 3/2018 | Kakiuchi et al. | |
| 2018/0099396 A1 | 4/2018 | Iida et al. | |
| 2018/0117728 A1 * | 5/2018 | Kawakami | B25F 5/008 |
| 2018/0133862 A1 | 5/2018 | Davis | |
| 2018/0345469 A1 | 12/2018 | Tanabe et al. | |
| 2019/0001477 A1 | 1/2019 | Ullrich et al. | |
| 2019/0358769 A1 * | 11/2019 | Miyazawa | B24B 23/02 |
| 2020/0246959 A1 | 8/2020 | Wolperding et al. | |
| 2020/0361057 A1 * | 11/2020 | Shibata | B24B 47/26 |

FOREIGN PATENT DOCUMENTS

| | | |
|---|---|---|
| CN | 100540219 C | 9/2009 |
| CN | 201483344 U | 5/2010 |
| CN | 201511358 U | 6/2010 |
| CN | 201702656 U | 1/2011 |
| CN | 201989023 U | 9/2011 |
| CN | 102390032 A | 3/2012 |
| CN | 103264375 A | 8/2013 |
| CN | 203156525 U | 8/2013 |
| CN | 203228211 U | 10/2013 |
| CN | 203680249 U | 7/2014 |
| CN | 203843645 U | 9/2014 |
| CN | 204621739 U | 9/2015 |
| CN | 105500296 A | 4/2016 |
| CN | 205271661 U | 6/2016 |
| CN | 106712381 A | 5/2017 |
| CN | 206211811 U | 5/2017 |
| CN | 206259796 U | 6/2017 |
| CN | 206471945 U | 9/2017 |
| CN | 206614377 U | 11/2017 |
| CN | 107553283 A | 1/2018 |
| CN | 107584382 A | 1/2018 |

(56) References Cited

FOREIGN PATENT DOCUMENTS

| | | |
|---|---|---|
| CN | 107671665 A | 2/2018 |
| CN | 207309647 U | 5/2018 |
| CN | 207459903 U | 6/2018 |
| CN | 207736065 U | 8/2018 |
| CN | 208163345 U | 11/2018 |
| CN | 108942568 A | 12/2018 |
| CN | 109015270 A | 12/2018 |
| CN | 208428076 U | 1/2019 |
| CN | 109301994 A | 2/2019 |
| DE | 1915713 A1 | 10/1970 |
| DE | 4211316 A1 | 10/1993 |
| DE | 4416044 C2 | 8/1996 |
| DE | 19503526 A1 | 8/1996 |
| DE | 10158266 B4 | 1/2004 |
| DE | 10330180 A1 | 1/2005 |
| DE | 10332522 A1 | 2/2005 |
| DE | 102004001548 A1 | 8/2005 |
| DE | 102004003531 A1 | 8/2005 |
| DE | 102004058579 A1 | 6/2006 |
| DE | 102005047400 B3 | 12/2006 |
| DE | 10036078 B4 | 4/2007 |
| DE | 202007003081 U1 | 10/2007 |
| DE | 19943628 B4 | 6/2008 |
| DE | 102006056854 A1 | 6/2008 |
| DE | 102006059348 A1 | 7/2008 |
| DE | 10236135 B4 | 6/2009 |
| DE | 102008044117 A1 | 6/2010 |
| DE | 102008044119 A1 | 6/2010 |
| DE | 102009002969 A1 | 11/2010 |
| DE | 102009002973 A1 | 11/2010 |
| DE | 102009002981 A1 | 11/2010 |
| DE | 202012100274 U1 | 3/2012 |
| DE | 102010042551 A1 | 4/2012 |
| DE | 102011006343 A1 | 7/2012 |
| DE | 102011079224 B3 | 12/2012 |
| DE | 102011113737 A1 | 3/2013 |
| DE | 102012204323 A1 | 9/2013 |
| DE | 102012213067 A1 | 1/2014 |
| DE | 102012214257 A1 | 2/2014 |
| DE | 202014102429 U1 | 6/2014 |
| DE | 102013207300 A1 | 10/2014 |
| DE | 102013211013 A1 | 12/2014 |
| DE | 102013219729 A1 | 3/2015 |
| DE | 102005052428 B4 | 6/2015 |
| DE | 102014103854 A1 | 9/2015 |
| DE | 102015006316 A1 | 11/2015 |
| DE | 10244793 B4 | 11/2016 |
| DE | 102017202371 A1 | 8/2018 |
| DE | 102017209832 A1 | 12/2018 |
| EP | 0246212 A2 | 11/1987 |
| EP | 0890420 A1 | 1/1999 |
| EP | 0856385 B1 | 7/2000 |
| EP | 1533084 B1 | 9/2007 |
| EP | 1752259 B1 | 3/2008 |
| EP | 2251150 A1 | 11/2010 |
| EP | 1510298 B1 | 12/2010 |
| EP | 2050328 B1 | 12/2010 |
| EP | 2111948 B1 | 6/2011 |
| EP | 2047953 B1 | 9/2011 |
| EP | 2253430 B1 | 11/2011 |
| EP | 2384859 B1 | 10/2013 |
| EP | 2058088 B1 | 7/2015 |
| EP | 3342536 A1 | 7/2018 |
| EP | 3375573 A1 | 9/2018 |
| EP | 2251149 B1 | 1/2019 |
| EP | 2251151 B1 | 1/2019 |
| EP | 2251152 B1 | 1/2019 |
| KR | 1020100030516 A | 3/2010 |
| KR | 1020110048693 A | 5/2011 |
| WO | WO2002038341 A1 | 5/2002 |
| WO | WO2009019052 A1 | 2/2009 |
| WO | WO2009019053 A1 | 2/2009 |
| WO | WO2009019054 A1 | 2/2009 |
| WO | WO2009043626 A1 | 4/2009 |
| WO | WO2009043627 A1 | 4/2009 |
| WO | WO2009043636 A1 | 4/2009 |
| WO | WO2009047185 A2 | 4/2009 |
| WO | WO2009047187 A2 | 4/2009 |
| WO | WO2009065681 A2 | 5/2009 |
| WO | WO2009074449 A1 | 6/2009 |
| WO | WO2009083299 A1 | 7/2009 |
| WO | WO2009083303 A1 | 7/2009 |
| WO | WO2009083308 A1 | 7/2009 |
| WO | WO2009083338 A1 | 7/2009 |
| WO | WO2009083341 A1 | 7/2009 |
| WO | WO2009101061 A1 | 8/2009 |
| WO | WO2009101062 A1 | 8/2009 |
| WO | WO2011060512 A1 | 5/2011 |
| WO | WO2014009133 A1 | 1/2014 |
| WO | WO2014028150 A1 | 2/2014 |
| WO | WO2017108414 A1 | 6/2017 |
| WO | WO2019031685 A1 | 2/2019 |
| WO | 2019058808 A1 | 3/2019 |

OTHER PUBLICATIONS

International Search Report and Written Opinion for Application No. PCT/US2020/037546 dated Sep. 28, 2020 (13 pages).
Milwaukee Electric Tool Company, "M12 Fuel Die Grinder," Service Parts List, Jun. 2019 (1 page).

* cited by examiner

ROTARY POWER TOOL

CROSS-REFERENCE TO RELATED APPLICATIONS

This application is a national phase filing under 35 U.S.C. 371 of International Application No. PCT/US2020/037546, filed Jun. 12, 2020, which claims priority to U.S. Provisional Patent Application No. 62/860,347, filed Jun. 12, 2019, and to U.S. Provisional Patent Application No. 62/909,281, filed Oct. 2, 2019, the entire contents of each of which are hereby incorporated by reference.

FIELD OF THE DISCLOSURE

The present disclosure relates to power tools, and more particularly to portable rotary power tools.

BACKGROUND OF THE INVENTION

Many of the portable grinding tools currently available that run at high operating speeds (e.g., 20,000 revolutions per minute (rpm) or greater) are pneumatic tools. Pneumatic motors powering these tools typically have very short output shafts that do not produce significant vibrations such high operating speeds (e.g., from 20,000 to 24,000 rpm). Electric motors, however, typically have a longer rotor shaft and output shaft. Due to the dimensions and the flexibility of this longer shaft, at high operating speeds the shaft tends to have resonant vibrations that shake the tool.

SUMMARY OF THE INVENTION

The present invention provides, in one aspect, a grinder including a motor housing, a motor, a handle coupled to the housing, and a vibration damping assembly. The motor is positioned in the motor housing and configured to rotatably drive an output shaft. The vibration damping assembly is positioned between the motor housing and the handle. The vibration damping assembly includes a first coupling portion defined by the motor housing, a second coupling portion defined by the handle, and an elastomeric damper captured between the first coupling portion and the second coupling portion. The first coupling portion includes a boss having a flange and a first groove. The second coupling portion defines an opening and includes first and second ribs extending into the opening and spaced apart along a longitudinal axis of the handle. The first and second ribs define a second groove therebetween. The damper occupies the first and second grooves.

The present invention provides, in another aspect, a power tool including a motor housing extending along a first axis, and a handle extending along a second axis perpendicular to the first axis. The power tool also includes a motor positioned in the motor housing, the motor including a stator supported within the motor housing, a rotor shaft defining a motor axis coaxial with the first axis, and a rotor supported on the rotor shaft for rotation about the motor axis. A portion of the rotor shaft defines an output shaft that extends outward from the motor housing, and a distal end of the output shaft is configured to couple to a tool holder configured to receive a cutting tool.

The present invention provides, in another aspect, a power tool including a housing defining a longitudinal housing axis, and a motor positioned in the housing. The power tool also includes a battery receptacle defined by the housing, the battery receptacle being configured to receive a battery pack insertable into the housing in a direction along the longitudinal axis. The power tool also includes a low friction wear member coupled to the housing proximate the battery receptacle. When the battery pack is inserted into the battery receptacle, the battery pack contacts and engages the low friction wear member to prevent abrasion between the housing and the battery pack.

The present invention provides, in another aspect, power tool including a motor housing extending along a first axis, a motor positioned in the motor housing and configured to rotatably drive an output shaft, and a handle coupled to the motor housing and extending along a second axis perpendicular to the first axis. The power tool also includes a vibration damping assembly positioned between the motor housing and the handle, the vibration damping assembly including a first coupling portion defined by the motor housing, a second coupling portion defined by the handle, and an elastomeric damper captured between the first coupling portion and the second coupling portion. The first coupling portion includes a boss, and the second coupling portion defines an opening configured to receive the boss. The first coupling portion includes a first mating surface facing toward the handle, and the second coupling portion includes a second mating surface facing toward the motor housing and positioned opposite the first mating surface. The damper includes a mating surface portion that extends outward in a direction transverse to the second axis, and the mating surface portion is positioned between the first and second mating surfaces.

The present invention provides, in another aspect, a power tool including a motor housing extending along a first axis, and a handle coupled to the motor housing. The power tool also includes a motor positioned in the motor housing, the motor including a stator supported within the motor housing, a rotor shaft defining a motor axis coaxial with the first axis, and a rotor supported on the rotor shaft for rotation about the motor axis. The power tool further includes a first rotor bearing and a second rotor bearing located at opposite respective ends of the rotor and rotatably supporting the rotor shaft, each of the first and second rotor bearings supported by the motor housing. The power tool also includes a bushing affixed to the rotor shaft between the rotor and the first rotor bearing, and a fan supported on the first bushing. The first bushing includes a balancing portion that extends axially away from the fan and toward the rotor and configured to have material removed therefrom to rotatably balance the rotor.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
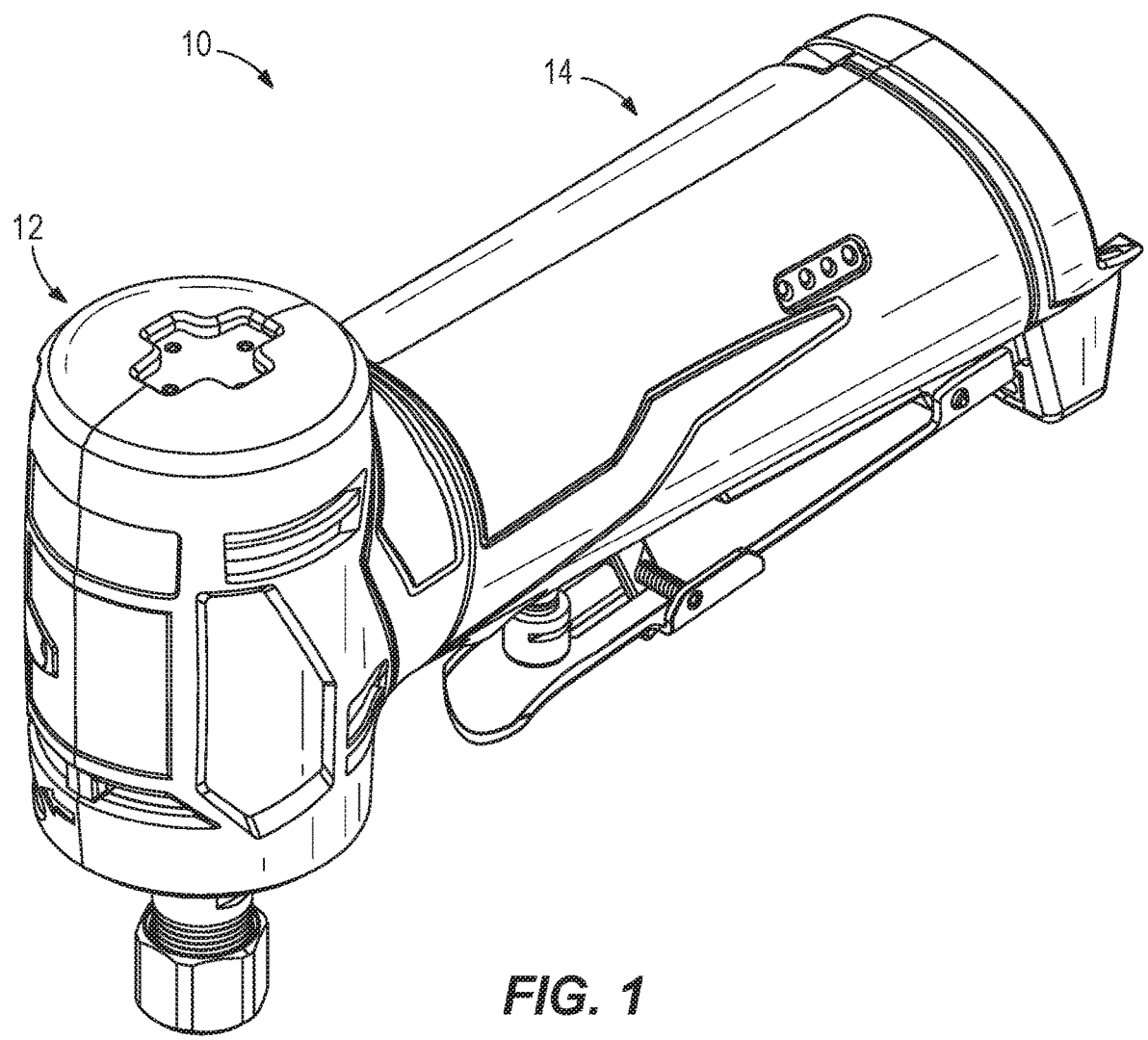
FIG. 1 is a perspective view of a portable rotary power tool, such as a die grinder.
Figure 2:
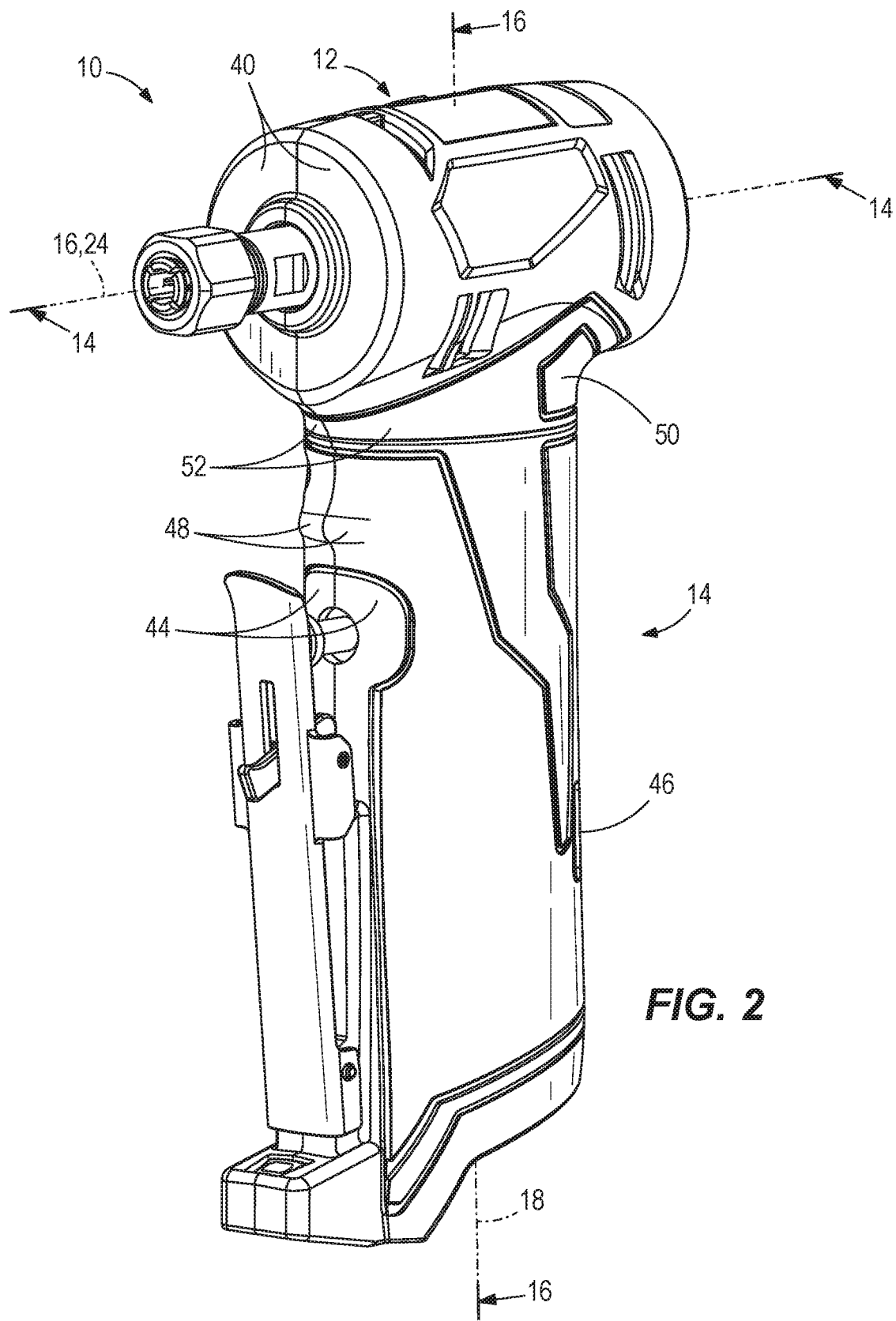
FIG. 2 is another perspective view of the die grinder of FIG. 1.

FIGS. 1-21 illustrate a portable powered grinding tool, such as a die grinder 10, according to an embodiment of the invention. As shown in FIGS. 1 and 2, the die grinder 10 includes a motor housing 12 and a handle 14 extending transversely from the motor housing 12. The motor housing 12 extends along a first axis 16, and the handle 14 extends along a second axis 18 which is transverse to the first axis 16. A motor 20 (FIG. 5) is located within the motor housing 12. The motor 20 includes a rotor shaft 22 extending longitudinally therethrough and defining a motor axis 24. In the illustrated embodiment, the first axis 16 is coaxial with the motor axis 24.

Figure 14:
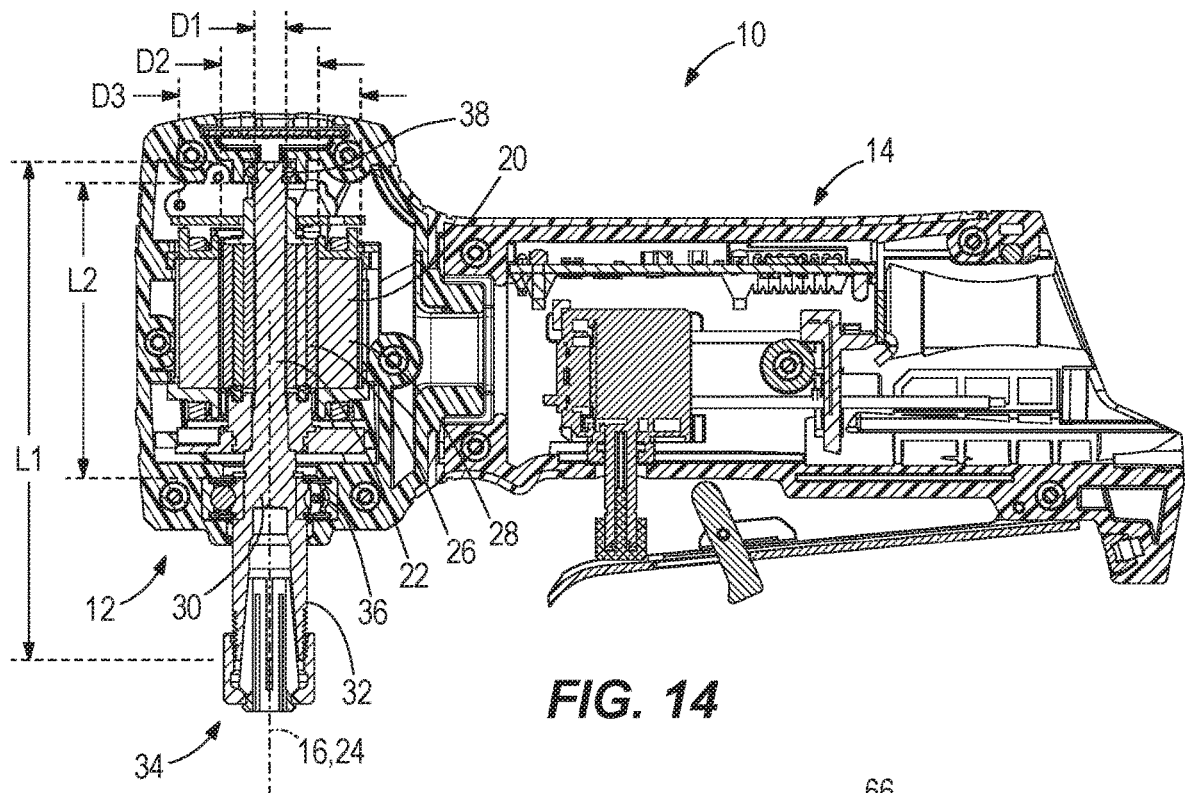
FIG. 14 is a cross-sectional view of the die grinder of FIG. 1, taken along line 14-14 of FIG. 2.
Figure 15:
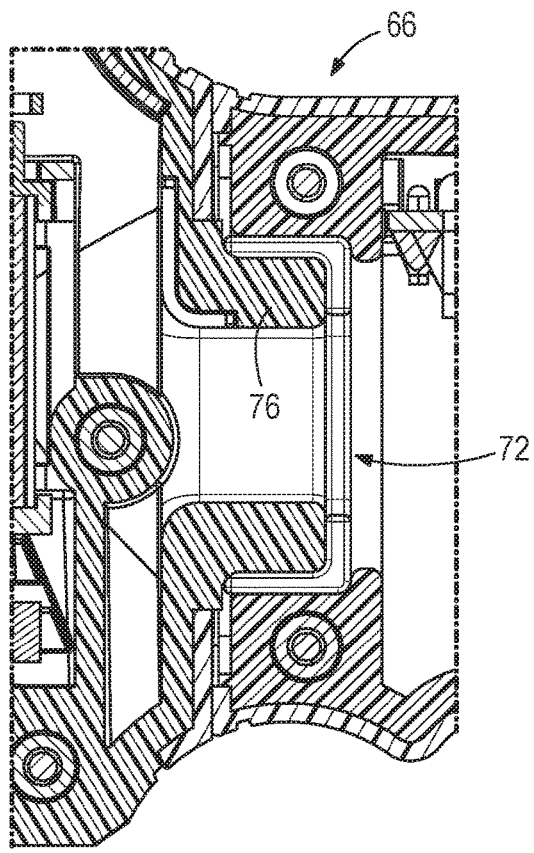
FIG. 15 is a detailed cross-sectional view of a portion of the die grinder of FIG. 1, taken along line 14-14 of FIG. 2.
Figure 16:
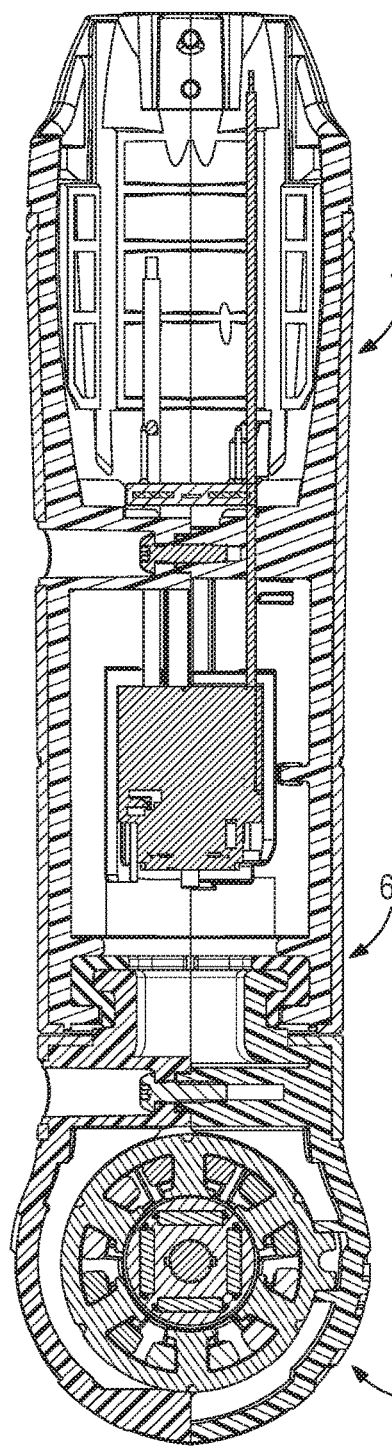
FIG. 16 is another cross-sectional view of the die grinder of FIG. 1, taken along line 16-16 of FIG. 3.

With reference to FIG. 14, the motor 20 also includes a rotor 26 and a stator 28 that surrounds the rotor 26. The stator 28 is supported within the motor housing 12 and remains stationary relative to the housing 14 during operation of the grinder 10. The rotor 26 is rotatably fixed to the rotor shaft 22 and configured to co-rotate with the rotor shaft 22, relative to the stator 28, about the motor axis 24. A portion of the rotor shaft 22 defines an output shaft 30 extending from the motor housing 12. A distal end 32 of the output shaft 30 is coupled to a tool holder 34 configured to receive a cutting tool (e.g., a grinding disc, a rotary burr, etc.).

The rotor shaft 22 is rotatably supported by first and second bearings 36, 38 coupled to the motor housing 12 and located adjacent opposite ends of the rotor 26. The first bearing 36 is positioned proximate the output shaft 30, and the second bearing 38 is positioned opposite the first bearing 36 with respect to the rotor 26. During operation of the grinder 10, the rotor shaft 22 is configured to rotate at speeds above 20,000 rpm (e.g., 24,500 rpm).

With continued reference to FIG. 14, in the illustrated embodiment, the rotor shaft 22 defines a shaft diameter D1 of approximately 6 millimeters (mm), the rotor 26 defines a rotor outside diameter D2 of approximately 18 mm, and the stator 28 defines a stator outside diameter D3 of approximately 36 mm. Providing the rotor shaft 22 with a shaft diameter D1 of 6 mm improves fatigue failure as compared to smaller diameter shafts, and allows the rotor shaft 22 to rotate at speeds greater than 20,000 rpm without failure. A housing head diameter D4 (FIG. 8) of a portion of the motor housing 12 surrounding the stator 28 is approximately 50.8 mm. The rotor shaft 22 defines a shaft length L1 of approximately 95.5 mm, measured from end to end along the first axis 16 (FIG. 14). The rotor shaft 22 further includes a bearing span L2 of approximately 57 mm, measured along the length of the rotor shaft 22 between the first and second bearings 36, 38.

In the illustrated embodiment, a first ratio R1 is defined as the ratio of the rotor outside diameter D2 to the rotor shaft diameter D1 (i.e., D2:D1). The first ratio R1 is 3:1. A second ratio R2 is defined as the ratio of the stator outside diameter D3 to the rotor shaft diameter D1 (i.e., D3:D1). The second ratio R2 is 6:1. A third ratio R3 is defined as the ratio of the bearing span L2 to the rotor shaft diameter D1 (i.e., L2:D1). The third ratio R3 is 9.5:1.

Figure 3:
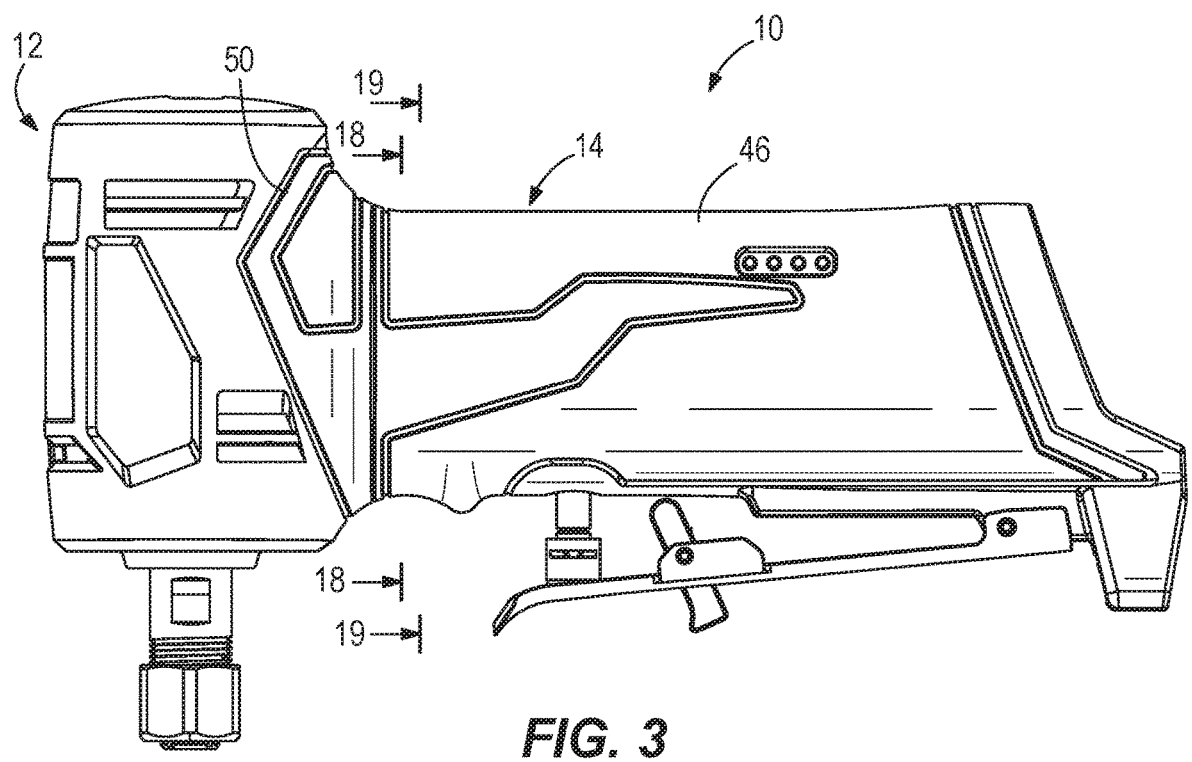
FIG. 3 is a plan view of the die grinder of FIG. 1.
Figure 4:
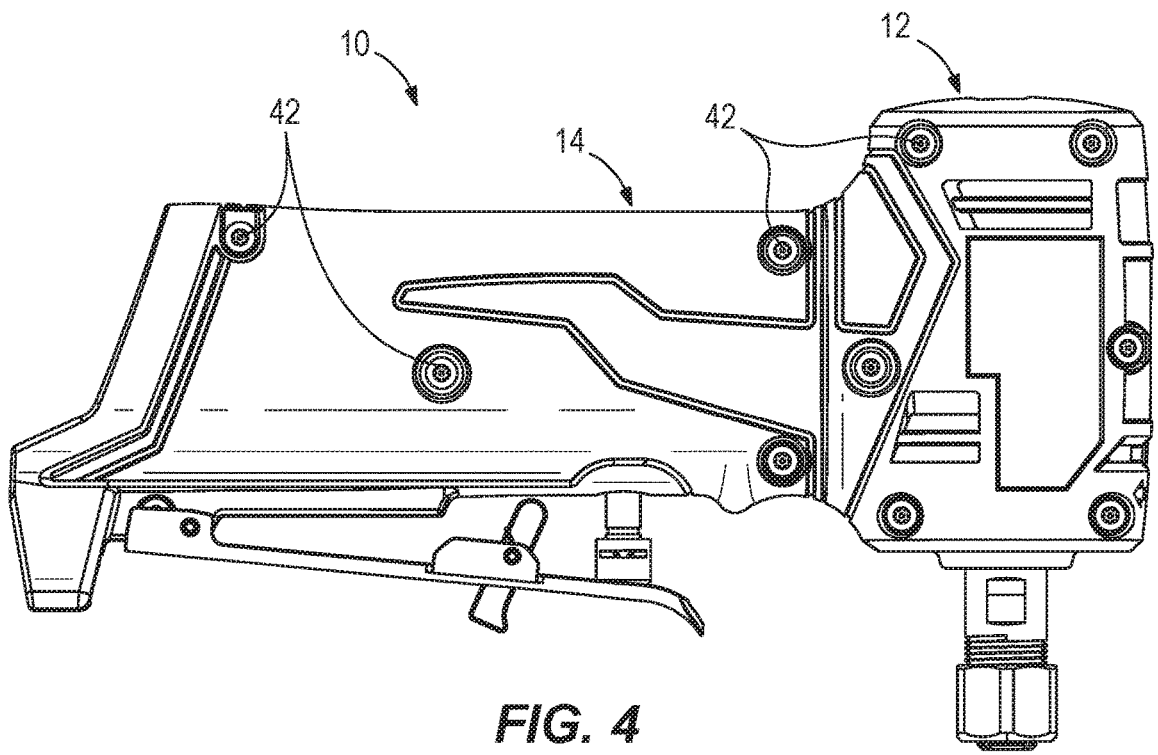
FIG. 4 is another plan view of the die grinder of FIG. 1.

With reference to FIGS. 2-4, the motor housing 12 includes a pair of motor half housings 40 coupled together via fasteners 42. The handle 14 likewise includes a pair of handle half housings 44 coupled together via fasteners 42. A grip 46 is overmolded on the handle 14 and divided into a pair of grip portions 48 adhered to each respective handle half housing 44. Similarly, a cover 50 is overmolded on the motor housing 12 and divided into a pair of cover portions 52 adhered to each respective motor half housing 40. The motor half housings 40 and the handle half housings 44 are formed of a relatively hard plastic material (e.g., ABS, PA, PP, PC, etc.), whereas the overmolded grip 46 and cover 50 are each formed from a relatively softer material (e.g., a thermoplastic elastomer, rubber, etc.).

Figure 5:
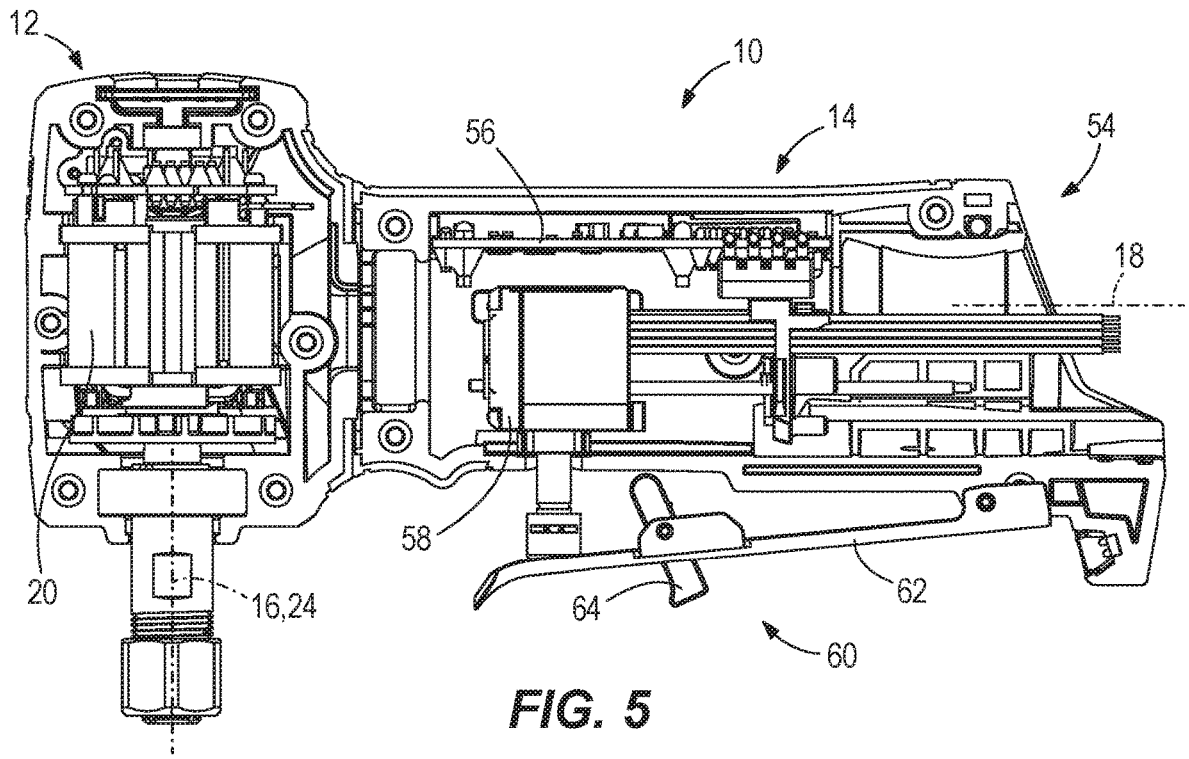
FIG. 5 is another plan view of the die grinder of FIG. 1, with portions removed.

With reference to FIG. 5, the handle 14 defines a battery receptacle 54, which is positioned on an end of the handle 14 opposite the motor housing 12. The battery receptacle 54 is configured to selectively mechanically and electrically connect to a rechargeable battery pack (not shown) for powering the motor 20 (FIG. 14). The battery pack is insertable into the battery receptacle 54 such that, when inserted, the battery pack may be oriented along the second axis 18. Alternatively, in another embodiment of the die grinder 10, the battery pack may be slidably coupled to the battery receptacle along an axis that is transverse to the second axis 18. The battery pack may include any of a number of different nominal voltages (e.g., 12V, 18V, etc.), and may be configured having any of a number of different chemistries (e.g., lithium-ion, nickel-cadmium, etc.). In alternative embodiments (not shown), the motor 20 may be powered by a remote power source (e.g., a household electrical outlet) through a power cord. The handle 14 further contains control electronics for the grinder 10 (e.g., a PCBA 56, a microswitch 58, etc.).

The handle 14 supports a trigger assembly 60 operable to selectively electrically connect the power source (e.g., the battery pack) and the motor 20. The trigger assembly 60 is a "lock-off" trigger assembly having a paddle member 62 and a lock-off member 64 supported by the paddle member 62. The paddle member 62 is operable to actuate the microswitch 58 (FIG. 5) to selectively activate and deactivate the motor 20 during operation of the die grinder 10. The lock-off member 64 selectively prevents operation of the paddle member 62. Specifically, the lock-off member 64 is pivotable to selectively lock and unlock the paddle member 62.

Figure 6:
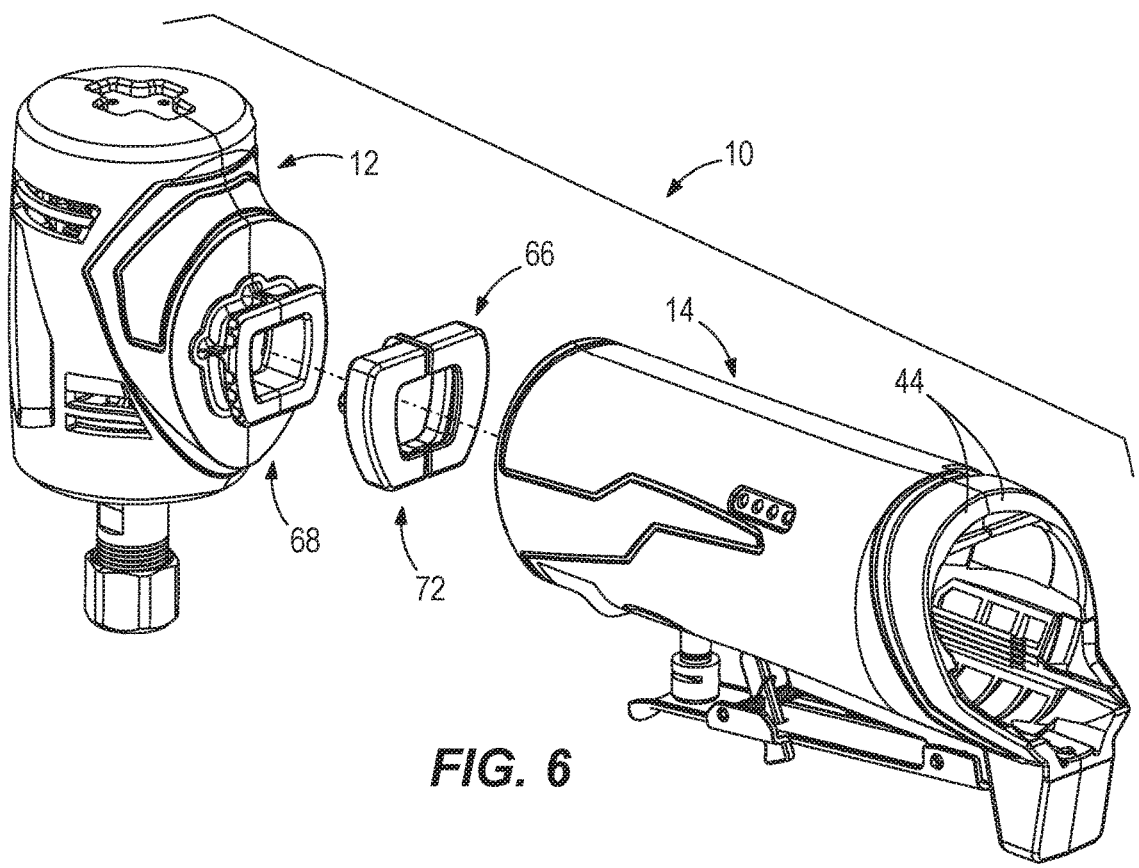
FIG. 6 is a partially exploded perspective view of the die grinder of FIG. 1, showing a motor housing, a handle, and an elastomeric damper.
Figure 7:
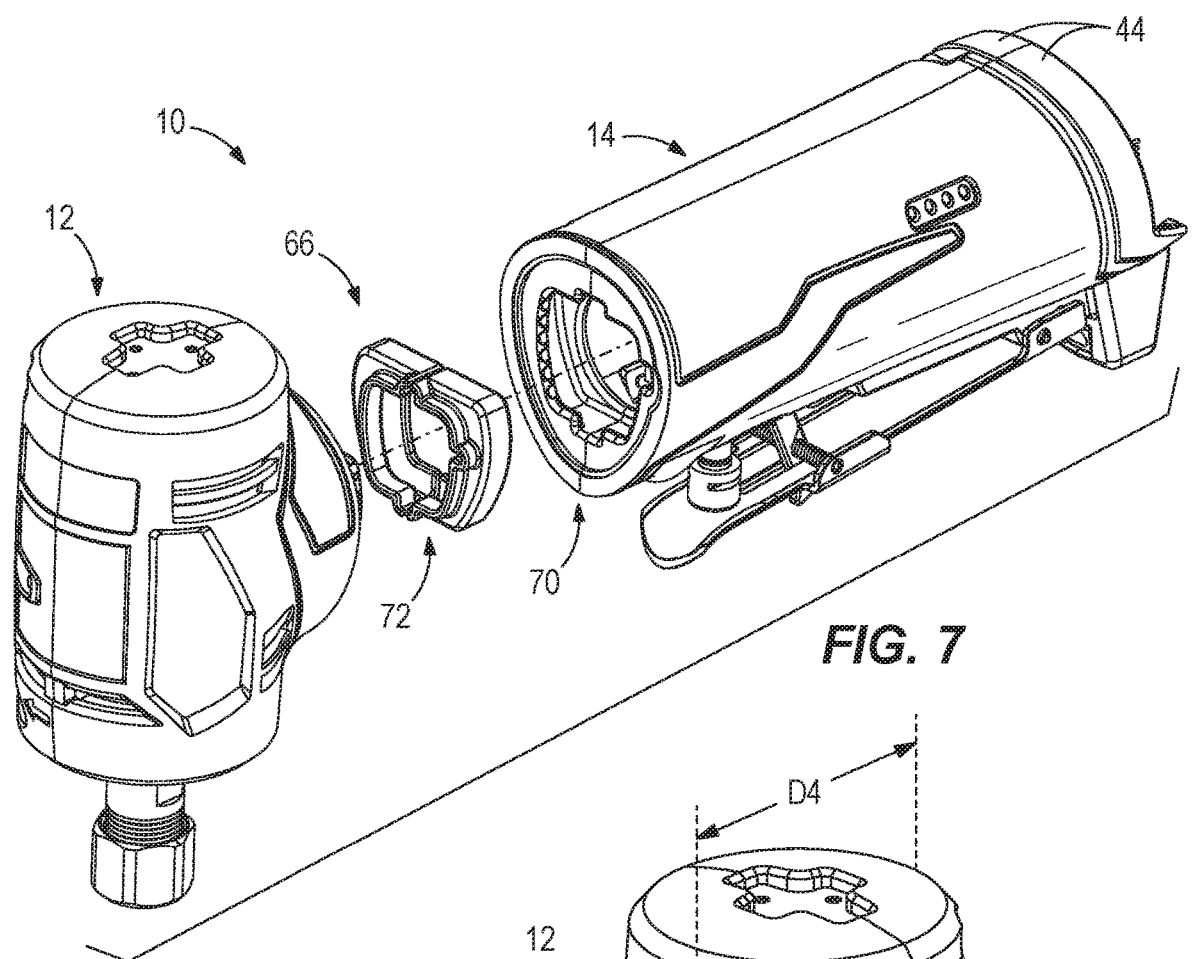
FIG. 7 is another partially exploded perspective view of the die grinder of FIG. 1.

With reference to FIGS. 6 and 7, the grinder 10 includes a vibration damping assembly 66 positioned between the motor housing 12 and the handle 14 to attenuate vibration from the motor housing 12. The damping assembly 66 includes a first coupling portion 68 defined by the motor housing 12, a second coupling portion 70 defined by the handle 14, and an elastomeric damper 72 positioned between the first and second coupling portions 68, 70. In the illustrated embodiment, the damper 72 is overmolded to the first coupling portion 68 of the motor housing 12, and then captured on its outer periphery by the second coupling portion 70 of the assembled half housings 44 of the handle 14.

Figure 8:
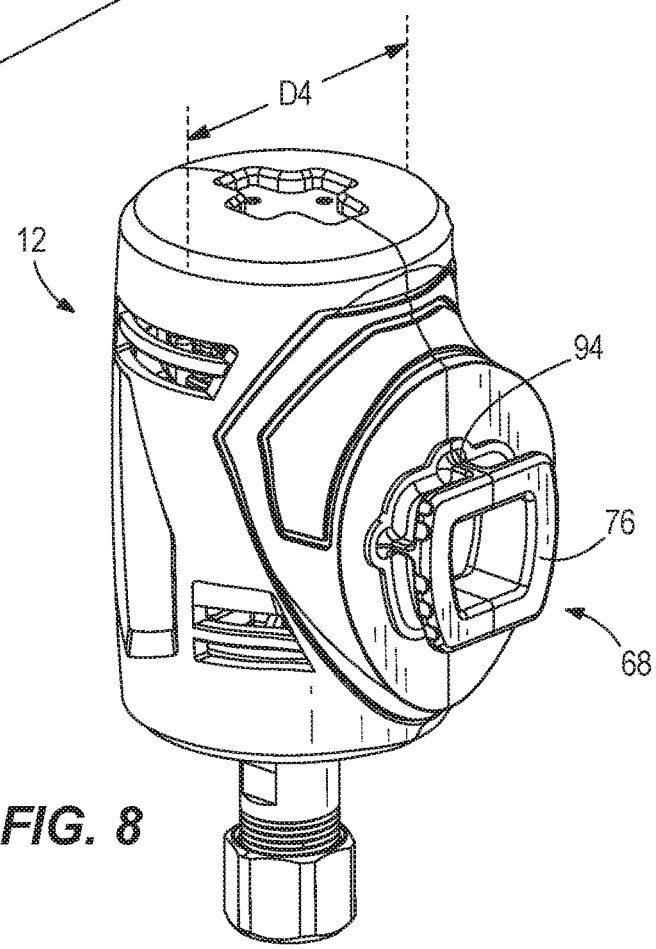
FIG. 8 is a perspective view of the motor housing of FIG. 6.
Figure 9:
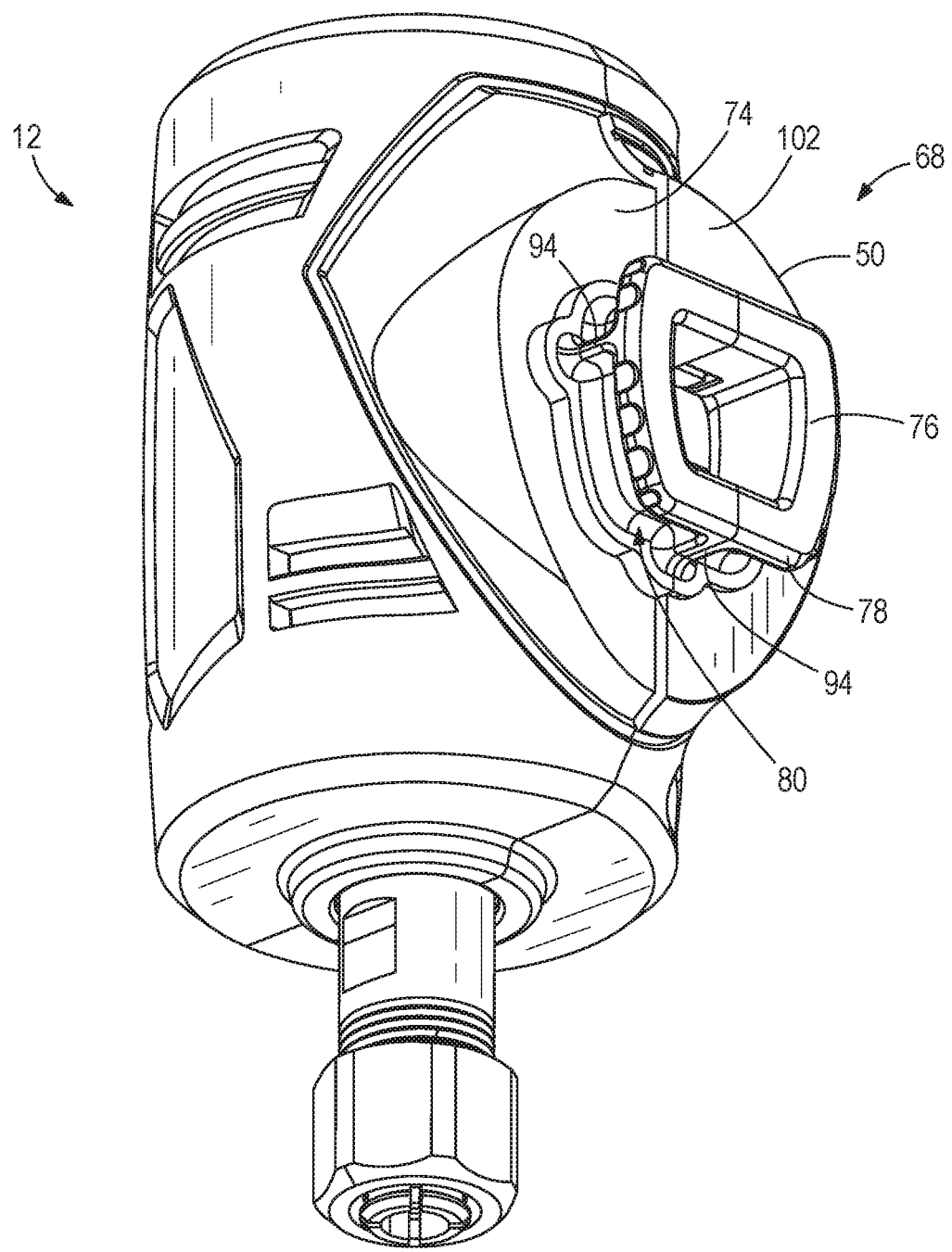
FIG. 9 is another perspective view of the motor housing of FIG. 6, with portions removed.
Figure 19:
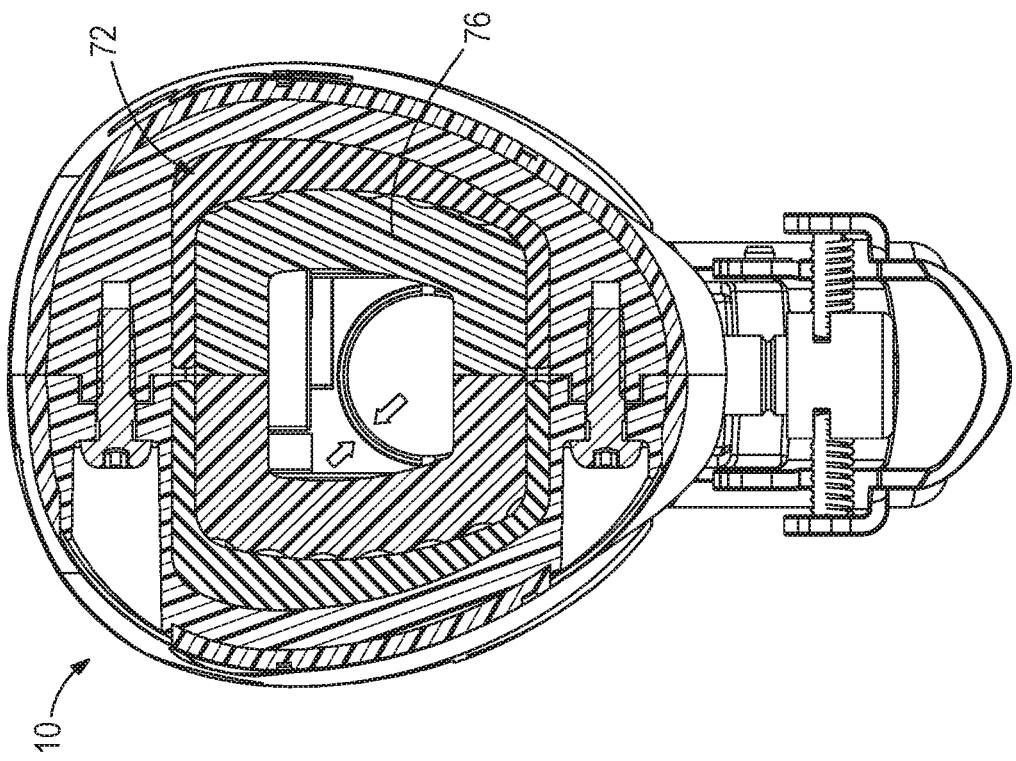
FIG. 19 is another cross-sectional view of the die grinder of FIG. 1, taken along line 19-19 of FIG. 3.
Figure 18:
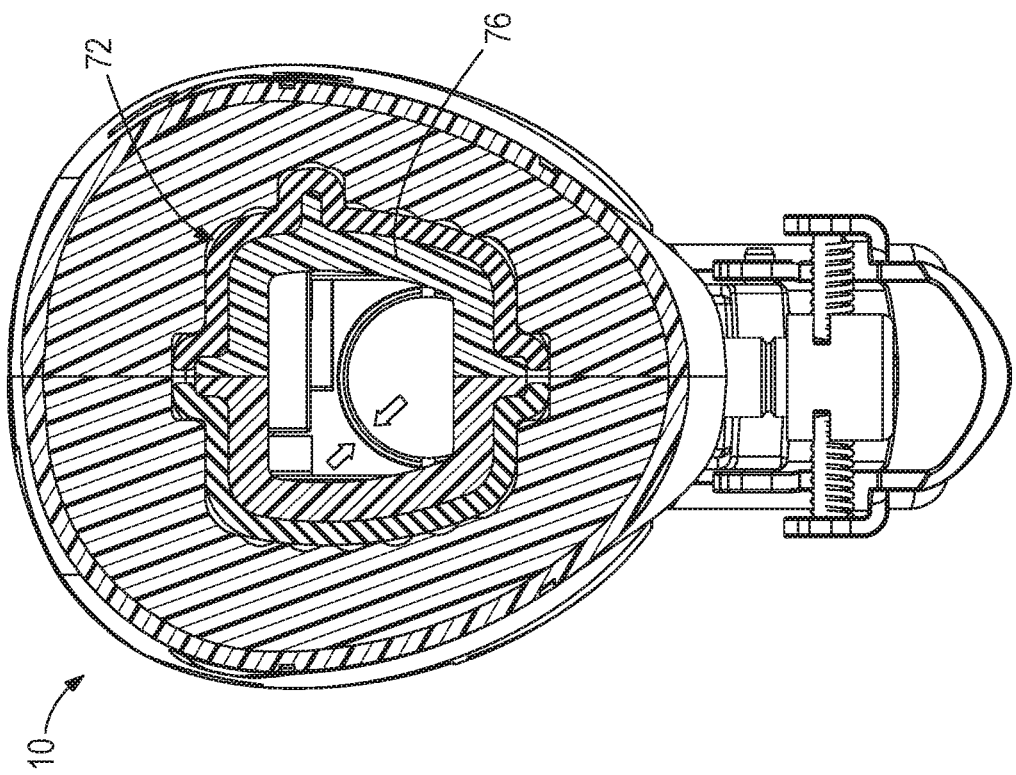
FIG. 18 is another cross-sectional view of the die grinder of FIG. 1, taken along line 18-18 of FIG. 3.

With reference to FIGS. 8 and 9, the first coupling portion 68 includes a flat first mating surface 74 facing toward the handle 14 in the assembled grinder 10, and a boss 76 extending from the first mating surface 74 toward the handle 14 in a direction generally along the second axis 18. The boss 76 terminates in a flange 78 that extends outward from the boss 76 in a direction generally transverse to the second axis 18 (i.e., in a radial direction). The first coupling portion 68 further includes a first groove 80 that circumscribes the boss 76 between the flange 78 and the first mating surface 74. In the illustrated embodiment, the boss 76 has a generally square cross-sectional shape as shown in FIGS. 18 and 19. In other embodiments (not shown), the boss 76 may have another cross-sectional shape (e.g., circular, rectangular, annular, conical, triangular, etc.).

Figure 10:
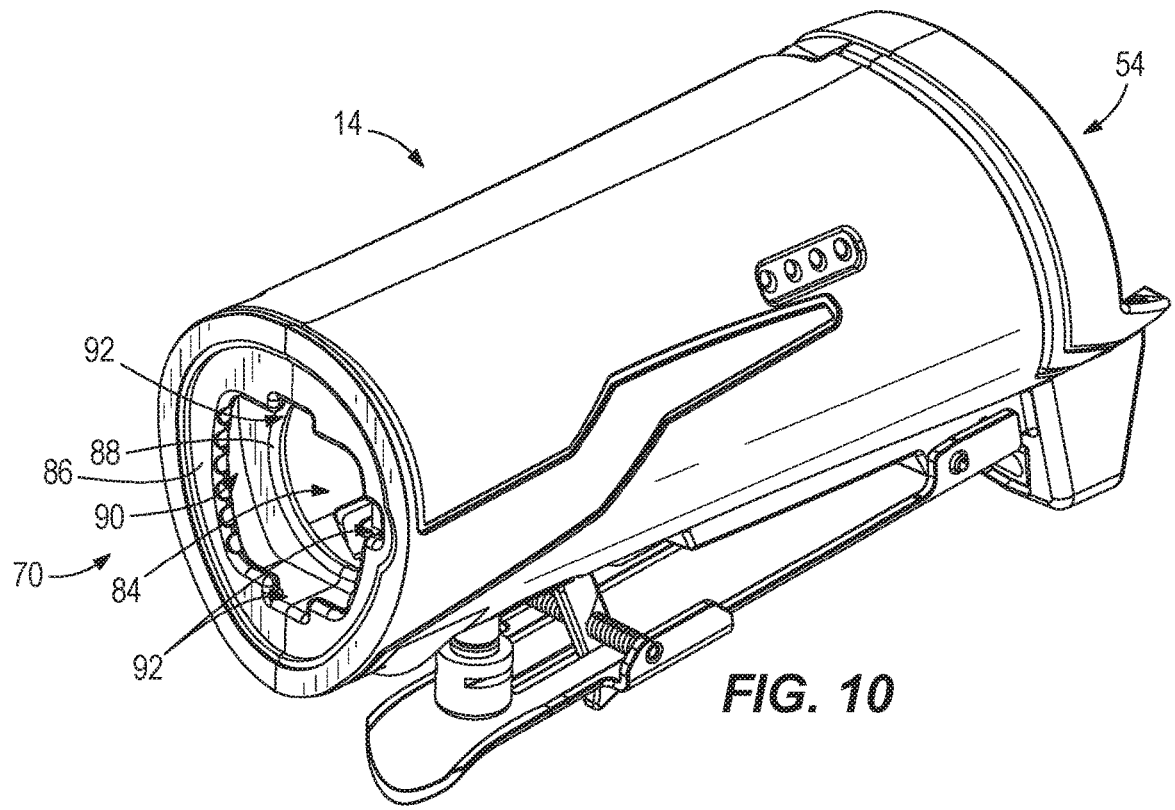
FIG. 10 is a perspective view of the handle of FIG. 6.
Figure 11:
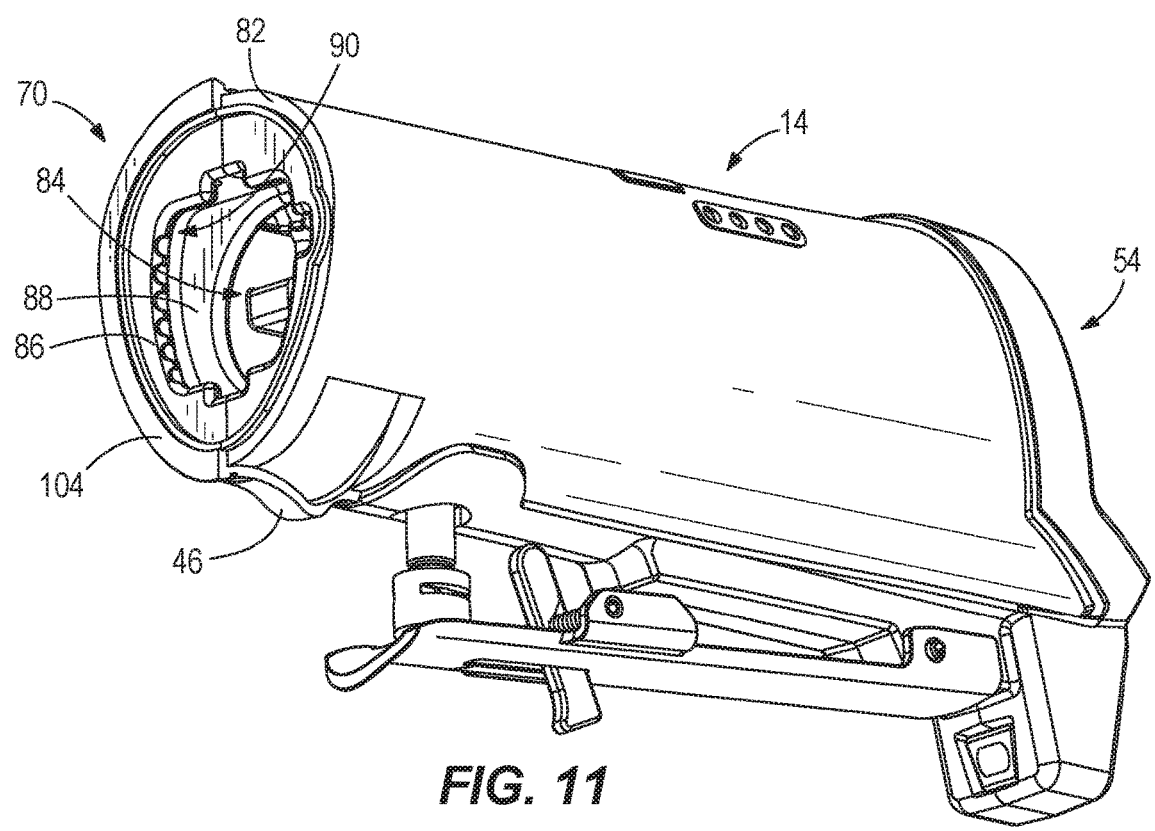
FIG. 11 is another perspective view of the handle of FIG. 6, with portions removed.

With respect to FIGS. 10 and 11, the second coupling portion 70 includes a flat second mating surface 82 facing toward the motor housing 12 and positioned opposite the first mating surface 74 in the assembled grinder 10. The second coupling portion 70 further defines an opening 84 extending from the second mating surface 82 toward the battery receptacle 54 along the second axis 18. The opening 84 is configured to receive the boss 76, such that the boss 76 is captured by the second coupling portion 70. The second coupling portion 70 further includes a first rib 86 and a second rib 88 spaced apart from one another along the second axis 18, with each rib 86, 88 extending inward toward an interior of the handle 14 in a direction generally transverse to the second axis 18 (i.e., in a radial direction). A second groove 90 is defined between the first and second ribs 86 and 88. Locating grooves 92 are defined in the first rib 86, and corresponding locating ribs 94 (FIGS. 9 and 10) are formed on the boss 76. The locating ribs 94 are received into the locating grooves 92 to properly orient the handle 14 with respect to the motor housing 12.

Figure 12:
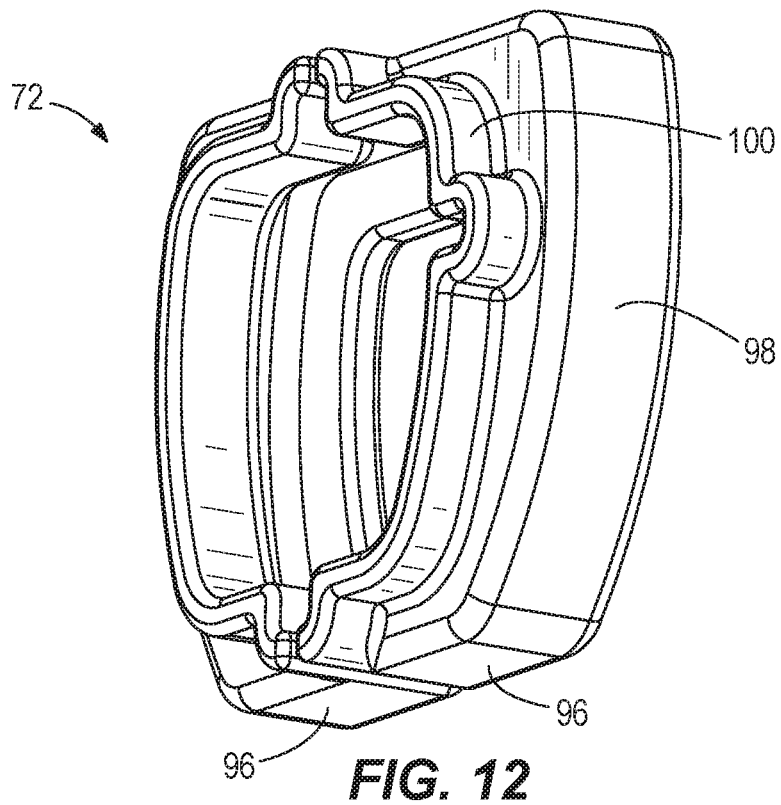
FIGS. 12 and 13 are perspective views of the elastomeric damper of FIG. 6.
Figure 13:
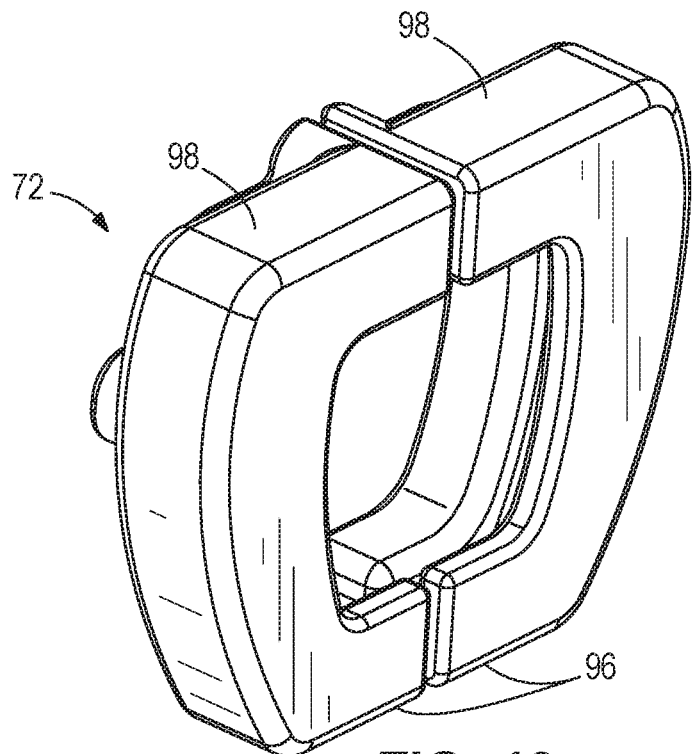

The damper 72 is overmolded to the boss 76. With reference to FIGS. 12 and 13, in the illustrated embodiment, the damper 72 is divided into two damper halves 96 corresponding to the two respective motor half housings 40. In other embodiments, the damper 72 may be molded separately from the motor housing 12 and subsequently coupled to the boss 76. In the same or other embodiments, the damper 72 may include a unitary construction, such that the damper is formed as a single piece. The damper 72 is formed of a softer material than that of the motor housing 12 and the handle 14, such as, e.g., rubber or a thermoplastic elastomer. In the illustrated embodiment, the damper 72 is formed of NBR (Buna N) and is configured to damp vibration from the motor housing 12 and limit transmission of the vibration from the motor housing 12 to the handle 14 and thus to a user's hand.

With continued reference to FIGS. 12 and 13, in the illustrated embodiment, each damper half 96 includes a flange portion 98 that surrounds the flange 78 (FIG. 9) of the boss 76, and a groove portion 100 extending in a direction along the second axis 18 and configured to seat into the first groove 80 (FIG. 9) of the boss 76. When the handle 14 is coupled to the motor housing 12, the flange portion 98 of each damper half 96 is received into the second groove 90 (FIG. 17) of the second coupling portion 70 and captured between the flange 78 and the second groove 90. Meanwhile, the groove portion 100 is captured between the first groove 80 (FIG. 17) and the first rib 86.

Figure 17:
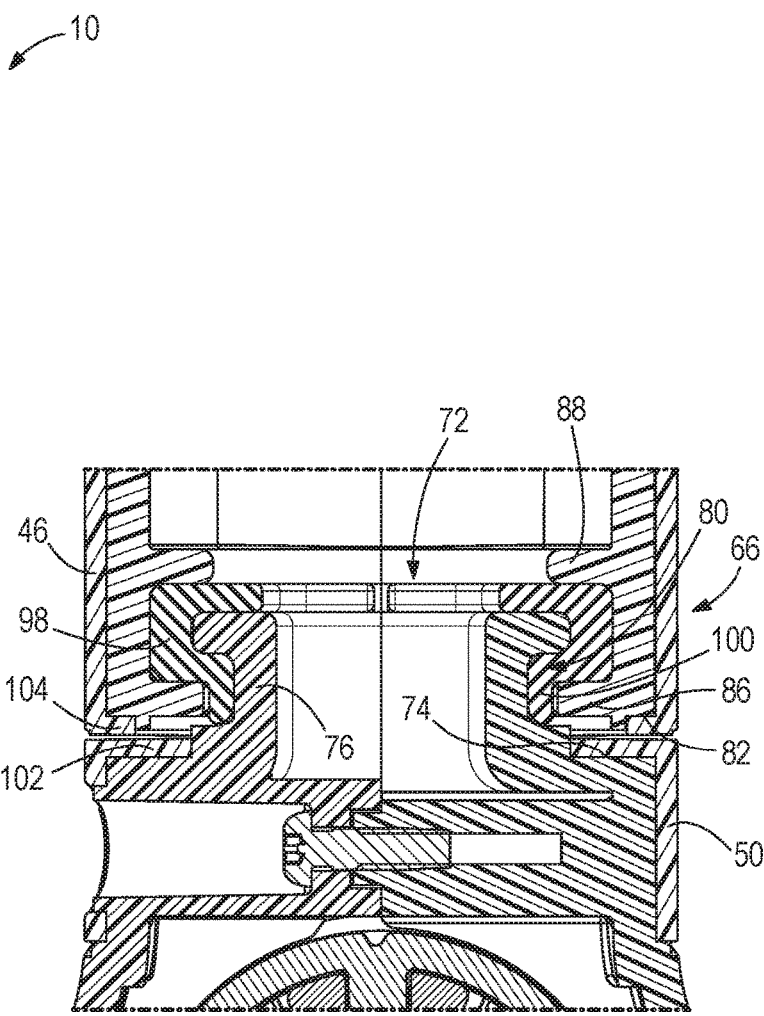
FIG. 17 is a detailed cross-sectional view of a portion of the die grinder of FIG. 1, taken along line 16-16 of FIG. 3.

With reference to FIGS. 9, 11, and 17, the overmolded cover 50 includes a first lip 102 that wraps over the first mating surface 74 of the first coupling portion 68. Likewise, the overmolded grip 46 includes a second lip 104 that wraps over the second mating surface 82 of the second coupling portion 70. In the assembled grinder 10, the first and second lips 102, 104 abut one another and are positioned between the first and second mating surfaces 74, 82. The first and second lips 102, 104 form an additional component of the damping assembly 66 and are configured to further attenuate the transmission of vibrations from the motor housing 12 to the handle 14 during operation of the grinder 10.

Figure 21:
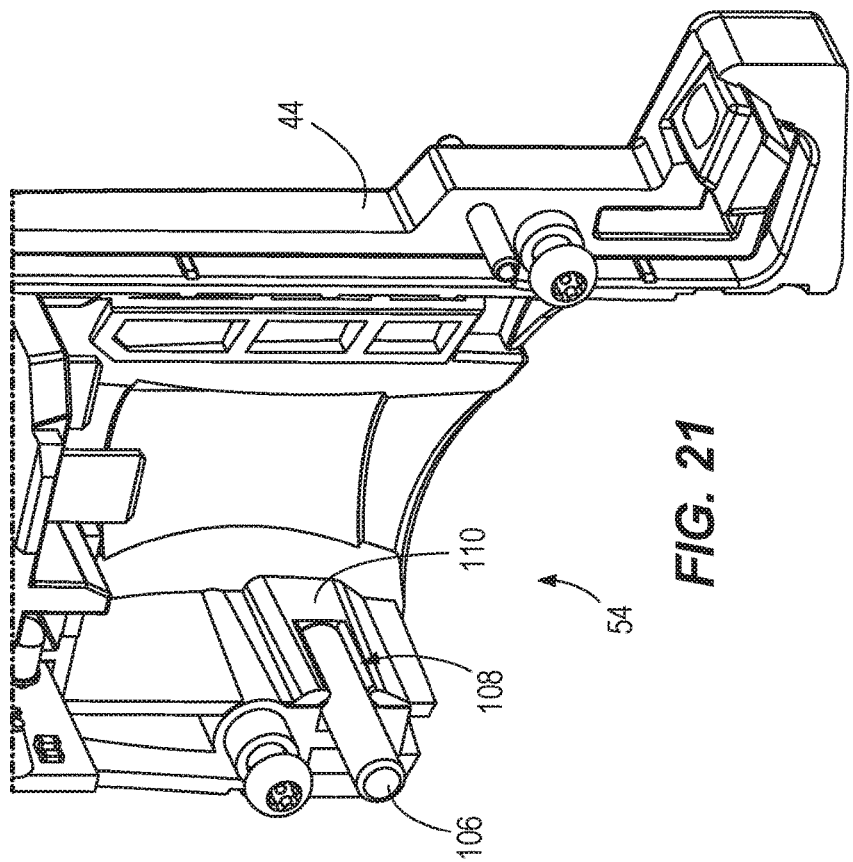
FIG. 21 is a detailed perspective view of a battery receptacle of the die grinder of FIG. 1 with portions removed.
Figure 20:
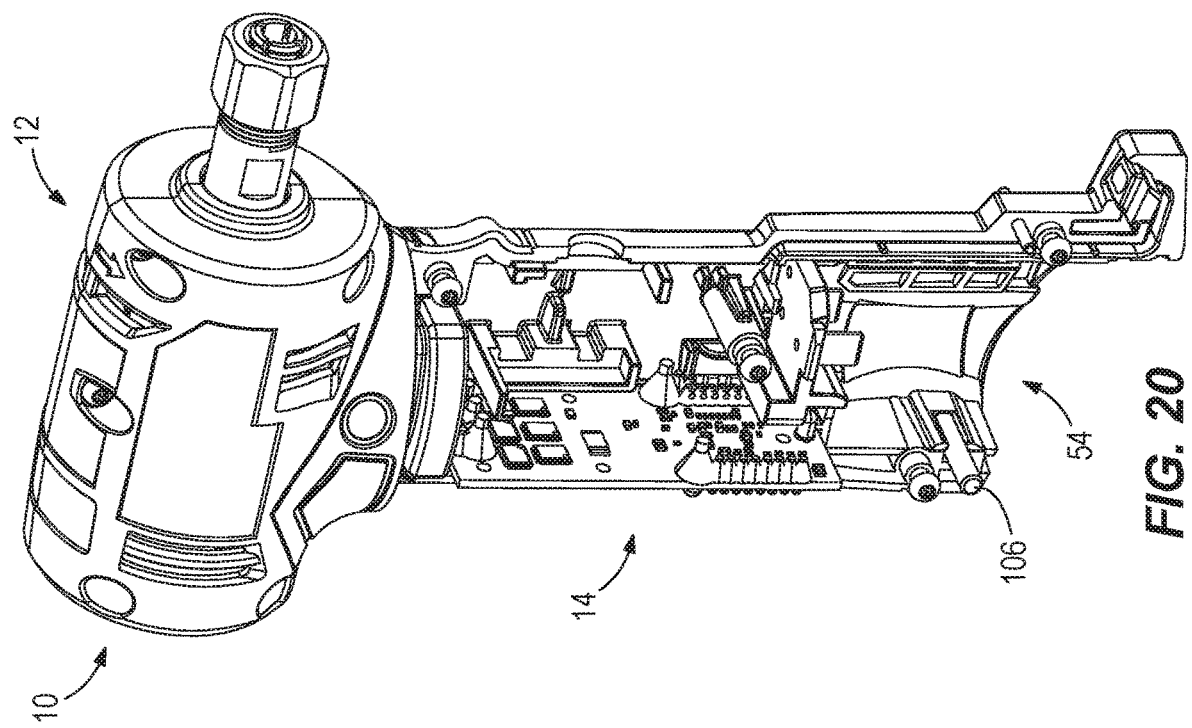
FIG. 20 is a perspective view of the die grinder of FIG. 1, with portions removed.
Figure 22:
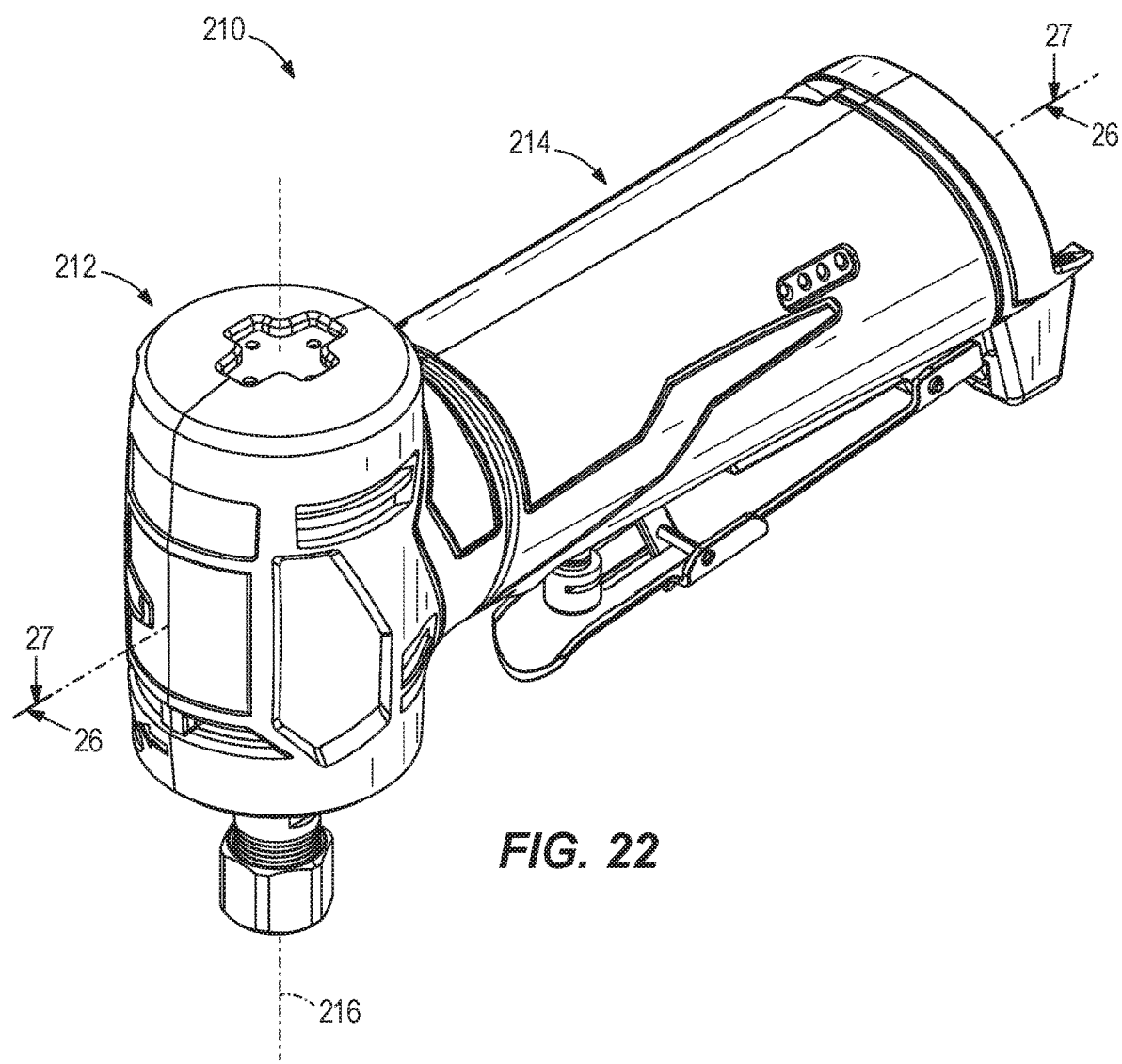
FIG. 22 is a perspective view of a portable rotary power tool, such as a die grinder.
Figure 23:
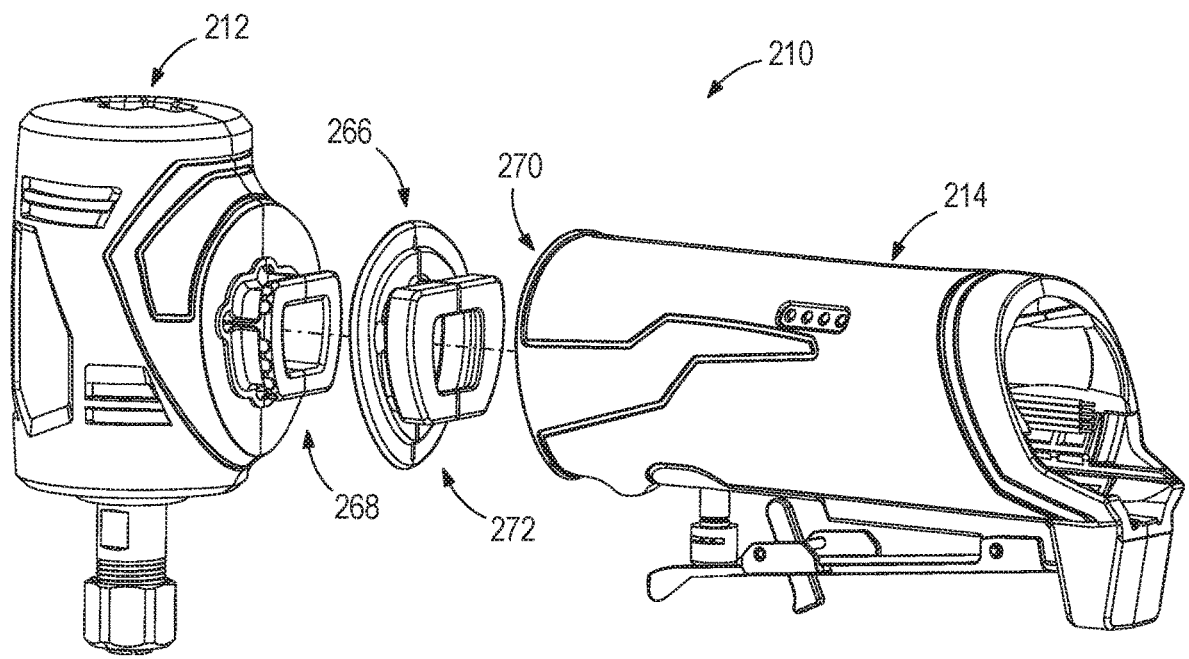
FIG. 23 is a partially exploded perspective view of the die grinder of FIG. 22, showing a motor housing, a handle, and an elastomeric damper.
Figure 24:
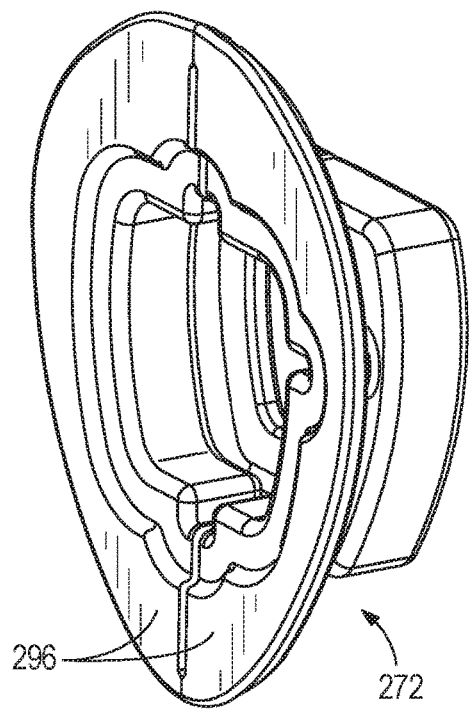
FIGS. 24 and 25 are perspective views of the elastomeric damper of FIG. 23.
Figure 25:
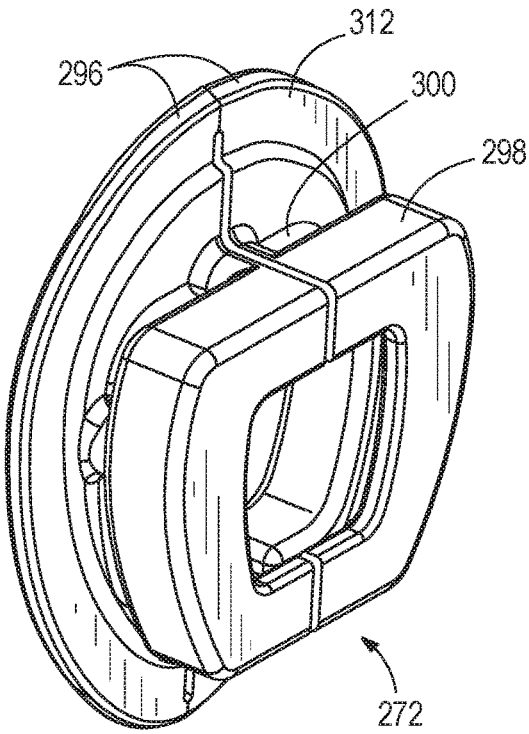

With reference to FIGS. 20 and 21, the die grinder 10 also includes a low friction wear member 106 positioned in a slot or recess 108 (e.g, by a nominal clearance fit) within an inner face 110 of the battery receptacle 54. The low friction wear member 106 is positioned where the battery contacts the receptacle 54 and configured as a rod 106 composed of PTFE. In other embodiments, the wear member 106 may alternatively be composed of, for example, polytetrafluoroethylene (PTFE or Teflon) or a thermoplastic elastomer (TPE). The wear member 106 provides a low friction surface against which the battery can slide to prevent abrasion and welding between the tool handle 14 and the battery, including under high vibration. In the illustrated embodiment, the recess 108 is defined in portions of each handle half housing 44, such that the wear member 106 is captured in the recess 108 between the two handle half housings 44.

FIGS. 22-27 illustrate a die grinder 210 according to another embodiment of the invention. The die grinder 210 is similar to the die grinder 10 and includes substantially the same structure as the die grinder 10. Accordingly, the following description focuses primarily on the structure and features that are different from the embodiments described above in connection with FIGS. 1-21. Features and elements that are described in connection with FIGS. 1-21 are numbered in the 200 and 300 series of reference numbers in FIGS. 22-27. It should be understood that the features of the die grinder 210 that are not explicitly described below have the same properties as the features of the die grinder 10.

With reference to FIGS. 22-25, the grinder 210 includes a vibration damping assembly 266 positioned between the motor housing 212 and the handle 214 to attenuate vibration from the motor housing 214. The damping assembly 266 includes a first coupling portion 268 defined by the motor housing 214, a second coupling portion 270 defined by the handle 218, and an elastomeric damper 272 positioned between the first and second coupling portions 268, 270. The first and second coupling portions 268, 270 are substantially the same as the first and second coupling portions 68, 70 described above. In the illustrated embodiment, the damper 272 is overmolded to the first coupling portion 268 of the motor housing 214, and then captured on its outer periphery by the second coupling portion 270 of the assembled half housings 244 of the handle 214.

Like the damper 72 described above, the damper 272 is divided into two damper halves 296 corresponding to the two respective motor half housings 240. The damper 272 likewise includes a flange portion 298 corresponding to the flange 278 of the first coupling portion 268, and a groove portion 300 extending in a direction along the second axis 218 and configured to seat into the first groove 280 of the boss 276. The damper 272 further includes a mating surface portion 312 that extends outward from the groove portion 300 in a direction generally transverse to the second axis 218 (i.e., in a radial direction). The groove portion 300 extends away from the flange portion 298 and terminates in the mating surface portion 312, such that the mating surface portion 312 is located opposite the flange portion 298 with respect to the grove portion 300.

Figure 26:
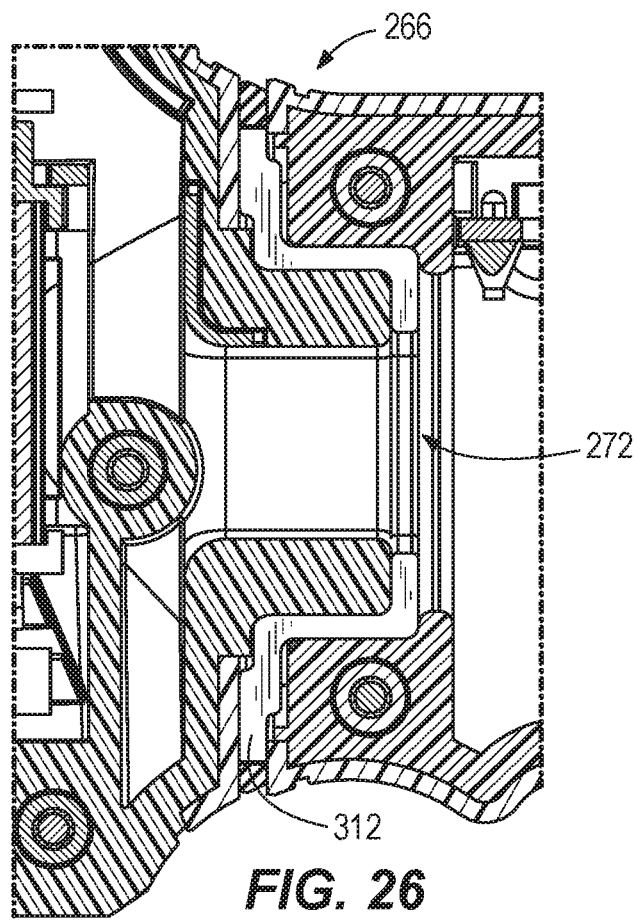
FIG. 26 is a detailed cross-sectional view of a portion of the die grinder of FIG. 22, taken along line 26-26 of FIG. 22.
Figure 27:
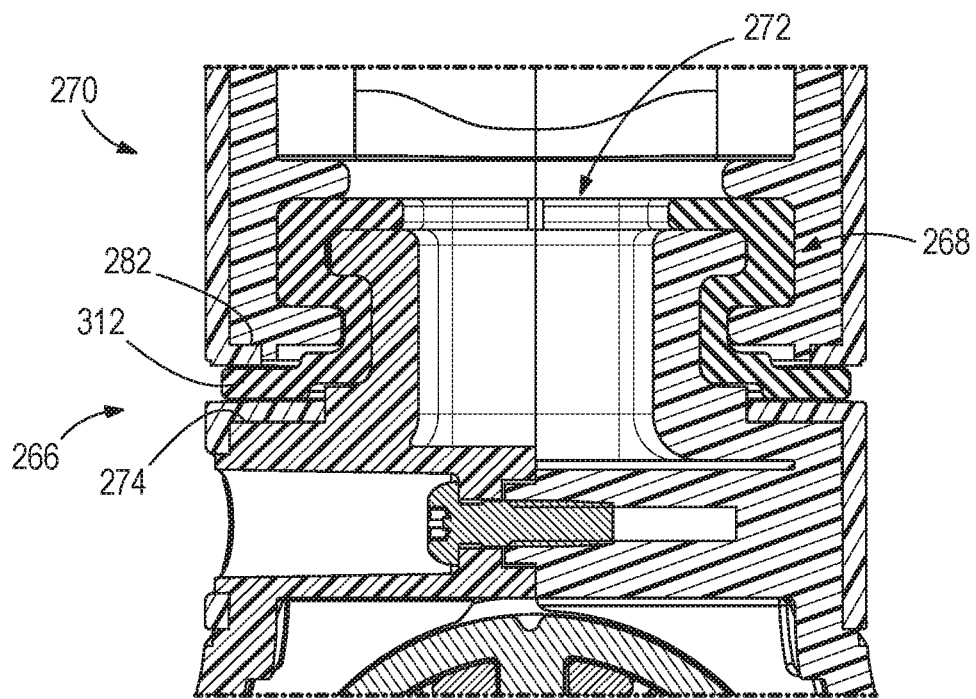
FIG. 27 is a detailed cross-sectional view of a portion of the die grinder of FIG. 22, taken along line 27-27 of FIG. 22.

With reference to FIGS. 26 and 27, the mating surface portion 312 corresponds to the first and second mating surfaces 274, 282 of the first and second coupling portions 268, 270. Specifically, in the assembled grinder 210, the mating surface portion 312 is positioned between the first and second mating surfaces 274, 282 and further attenuates vibrations transferred from the motor housing 212 to the handle 214.

Figure 28:
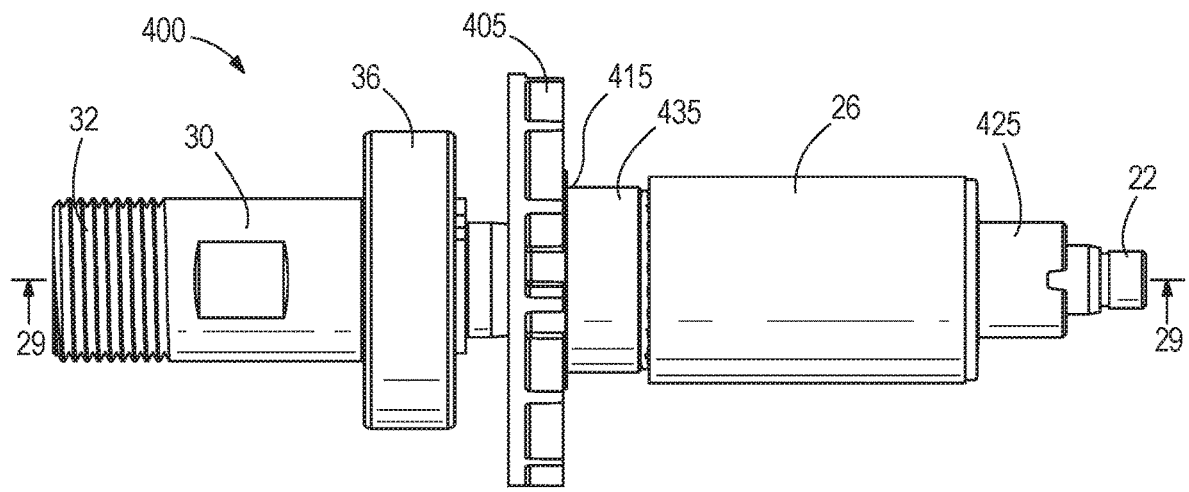
FIG. 28 is a plan view of a rotor assembly of the die grinders of FIGS. 1 and 22.

FIG. 28 illustrates a rotor assembly 400 for use in either of the die grinders 10, 210. Although the rotor assembly 400 is described herein in terms of the reference numerals associated with the die grinder 10, it should be understood that the rotor assembly 400 is equally applicable to the die grinder 210. The rotor assembly 400 includes the rotor 26, the rotor shaft 22, the first bearing 36, a fan 405, and first and second bushings 415, 425. As discussed above, a portion of the rotor shaft 22 defines the output shaft 30 that couples to the tool holder 34 (e.g., a collet and nut assembly; FIG. 14) at the distal end 32. By forming the rotor shaft 22 integrally with the output shaft 30, the die grinders 10, 210 avoid the need for an additional coupler between the rotor shaft 22 and the output shaft 30. This reduces the length of the rotor assembly 400, and allows the motor 20 to be arranged in-line with the output shaft 30. This further allows the motor axis 24 (FIG. 2) to be arranged transverse to the first axis 16, as discussed above.

Figure 29:
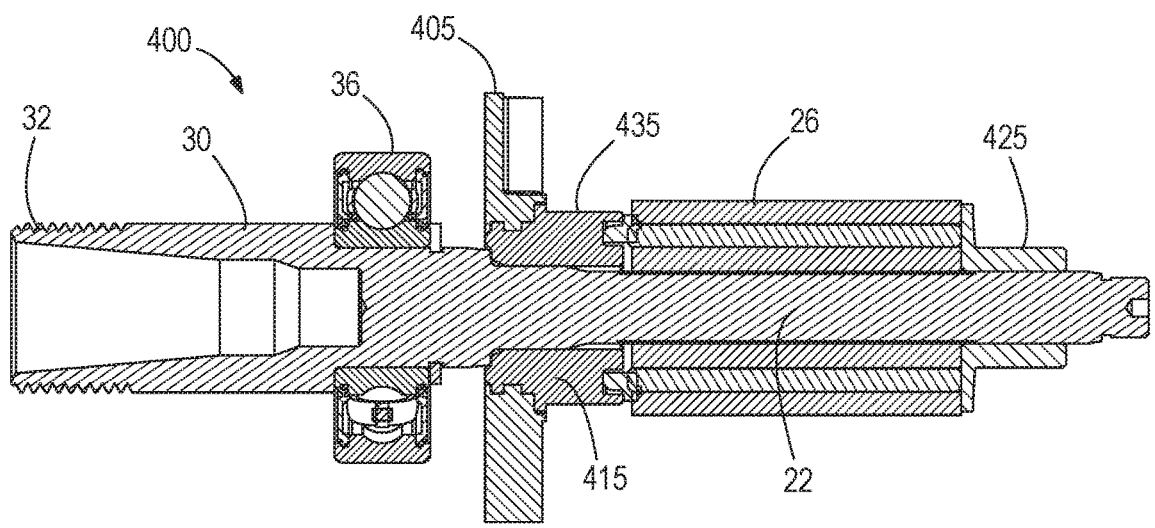
FIG. 29 is a cross-sectional view of the rotor assembly of FIG. 28, taken along line 29-29 of FIG. 28.

With reference to FIGS. 28 and 29, in the illustrated embodiment of the rotor assembly 400, the first bushing 415 is affixed to the rotor shaft 22 adjacent the rotor 26. The fan 405 is supported on the first bushing 415 such that the first bushing 415 couples the fan 405 to the rotor shaft 22. The first bushing 415 further includes a balancing portion 435 that extends axially away from the fan 405. In other embodiments of the rotor assembly 400, the fan 405 may be coupled directly to the rotor shaft 22 rather than indirectly via the first bushing 415.

During assembly of the die grinders 10, 210, the rotor assembly 400 is assembled as described above and as shown in FIG. 28. Once assembled, the rotor assembly 400 is rotatably balanced to eliminate or reduce vibration that may otherwise occur as the rotor assembly 400 rotates during operation of the die grinders 10, 210. In some embodiments of the die grinders 10, 210, the rotor assemblies may be balanced by removing material from a back side of the fan 405. However, when the illustrated rotor assembly 400 is assembled, access to the fan 405 can be difficult due to the proximity of the rotor 26 and the first bearing 36. Moreover, material shavings removed from the fan 405 could potentially ingress into the first bearing 36.

In the illustrated embodiment, the rotor assembly 400 can be balanced by removing material from the balancing portion 435 of the first bushing 415. In this regard, the first bushing 415 may be made from a relatively heavy material such as metal (e.g., copper). In some embodiments, material can be removed from the balancing portion 435 by drilling into the balancing portion 435 in a radial direction as indicated by the arrow shown in FIG. 28. Since the balancing portion 435 of the first bushing 415 is more easily accessed than the back side of the fan 405, this reduces the risk that other components of the rotor assembly 400 are inadvertently contacted during the drilling step. This also reduces the likelihood that material shavings removed during the drilling process ingress into the first bearing 36, which is shielded in an axial direction by the fan 405.

Various features of the invention are set forth in the following claims.

What is claimed is:

1. A power tool comprising:
   a motor housing including an elastomeric cover having a first lip portion;
   a motor positioned in the motor housing and configured to rotatably drive an output shaft;
   a handle coupled to the motor housing; and
   a vibration damping assembly including a first coupling portion defined by the motor housing, a second coupling portion defined by the handle, and an elastomeric damper captured between the first coupling portion and the second coupling portion;
   wherein the first coupling portion includes a boss having a flange and a first groove, the second coupling portion defines an opening and includes first and second ribs extending into the opening and spaced apart along a longitudinal axis of the handle, the first and second ribs define a second groove therebetween, and the damper occupies the first and second grooves, and
   wherein the first coupling portion includes a first mating surface facing toward the handle, the second coupling portion includes a second mating surface facing toward the motor housing and positioned opposite the first mating surface, the first lip portion wraps over the first mating surface such that the first lip portion is positioned between the first and second mating surfaces, and the handle includes an elastomeric grip having a second lip portion that wraps over the second mating surface such that the second lip portion is positioned between the first and second mating surfaces.

2. The power tool of claim 1, wherein the first coupling portion includes the first mating surface facing toward the handle, and wherein the first groove circumscribes the boss and is defined between the first mating surface and the flange.

3. The power tool of claim 2, wherein the second coupling portion includes the second mating surface facing toward the motor housing and positioned opposite the first mating surface, and wherein one of the first coupling portion and the second coupling portion includes a locating rib, and the other of the first coupling portion and the second coupling portion includes a locating groove that receives the locating rib to locate the handle with respect to the motor housing.

4. The power tool of claim 1, wherein the motor housing comprises two motor half housings, and the damper comprises two damper halves each coupled to a respective motor half housing.

5. The power tool of claim 1, wherein the damper is overmolded to the first coupling portion.

6. The power tool of claim 1, wherein:
the motor housing extends along a first axis;
the handle extends along a second axis perpendicular to the first axis;
the first coupling portion includes the first mating surface facing toward the handle;
the second coupling portion includes the second mating surface facing toward the motor housing and positioned opposite the first mating surface;
the damper includes a mating surface portion that extends outward in a direction transverse to the second axis; and
the mating surface portion is positioned between the first and second mating surfaces.

7. The power tool of claim 6, further comprising a battery pack oriented along the second axis.

8. The power tool of claim 6, wherein the flange extends outward in a radial direction transverse to the second axis.

9. The power tool of claim 8, wherein the damper is overmolded to the boss.

10. The power tool of claim 1, wherein the elastomeric grip includes two grip portions.

11. The power tool of claim 1, wherein the boss has a square cross-sectional shape.

12. The power tool of claim 1, wherein the handle includes a first handle half housing and a second handle half housing.

13. The power tool of claim 12, wherein the first handle half housing and the second handle half housing define a recess.

14. The power tool of claim 13, further comprising a friction wear member positioned in the recess.

* * * * *